US012597151B2

(12) United States Patent
Miller et al.

(10) Patent No.: US 12,597,151 B2
(45) Date of Patent: Apr. 7, 2026

(54) SYSTEMS AND METHODS TO DETERMINE VEGETATION ENCROACHMENT ALONG A RIGHT-OF-WAY

(71) Applicant: MARATHON PETROLEUM COMPANY LP, Findlay, OH (US)

(72) Inventors: Luke R. Miller, Findlay, OH (US); Joshua J. Beard, Findlay, OH (US); Brittan Battles, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 18/589,742

(22) Filed: Feb. 28, 2024

(65) Prior Publication Data

US 2025/0095359 A1 Mar. 20, 2025

Related U.S. Application Data

(60) Provisional application No. 63/540,822, filed on Sep. 27, 2023, provisional application No. 63/540,692, (Continued)

(51) Int. Cl.
*G06T 7/50* (2017.01)
*A01D 34/835* (2006.01)
(Continued)

(52) U.S. Cl.
CPC .............. *G06T 7/50* (2017.01); *A01D 34/835* (2013.01); *G06T 17/05* (2013.01); *G06V 10/25* (2022.01);
(Continued)

(58) Field of Classification Search
CPC ...... G06V 20/188; G06V 10/25; G06V 20/17; G06V 10/26; G06V 10/764; A01D 34/835
See application file for complete search history.

(56) References Cited

U.S. PATENT DOCUMENTS

| 2,626,627 A | 1/1953 | Jung et al. |
| 2,864,252 A | 12/1958 | Schaschl |

(Continued)

FOREIGN PATENT DOCUMENTS

| AU | 2010241217 | 11/2010 |
| AU | 2013202839 | 5/2014 |

(Continued)

OTHER PUBLICATIONS

Sadovnychiy, Sergiy, et al. "Geographical information system applications for pipeline right of way aerial surveillance." International Conference on Geographical Information Systems Theory, Applications and Management. vol. 2. Scitepress, 2017. (Year: 2017 ).*

(Continued)

*Primary Examiner* — Utpal D Shah
(74) *Attorney, Agent, or Firm* — Ray Quinney & Nebeker; Paul N. Taylor

(57) ABSTRACT

Embodiments of systems and methods to determine vegetation migration encroachment along a right-of-way associated with an underground feature are disclosed. In an embodiment, the method may include capturing images of one or more sections of the right-of-way at a selected time period. The method may include georeferencing the images to correlate the images with a surface of a geographical location of the right-of-way. The method may include determining and clipping an area of interest for the images. The method may include tiling clipped images to a preselected size to define a plurality of tiled clipped images. The method may include determining a vegetation migration encroachment onto the right-of-way by application of the clipped images to the trained machine learning model. The method may include, in response to a determination that the vegetation migration encroachment exceeds a threshold, generating an indication of vegetation migration encroachment.

30 Claims, 11 Drawing Sheets

Related U.S. Application Data filed on Sep. 27, 2023, provisional application No. 63/539,039, filed on Sep. 18, 2023.

(51) Int. Cl.

| | |
|---|---|
| *G06T 17/05* | (2011.01) |
| *G06V 10/25* | (2022.01) |
| *G06V 10/26* | (2022.01) |
| *G06V 10/764* | (2022.01) |
| *G06V 20/10* | (2022.01) |
| *G06V 20/17* | (2022.01) |

(52) U.S. Cl.
CPC ............ *G06V 10/26* (2022.01); *G06V 10/764* (2022.01); *G06V 20/17* (2022.01); *G06V 20/188* (2022.01); *G06T 2207/10032* (2013.01)

(56)　　　　References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,814,148 A | 6/1974 | Wostl |
| 3,925,592 A | 12/1975 | Webb |
| 3,961,493 A | 6/1976 | Nolan, Jr. |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,315,602 A | 2/1982 | Kubacak |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,784,324 A | 11/1988 | DeWitt |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,072,380 A | 12/1991 | Randelman et al. |
| 5,095,977 A | 3/1992 | Ford |
| 5,129,432 A | 7/1992 | Dugger |
| 5,191,537 A | 3/1993 | Edge |
| 5,305,631 A | 4/1994 | Whited |
| 5,367,882 A | 11/1994 | Lievens et al. |
| 5,383,243 A | 1/1995 | Thacker |
| 5,423,607 A | 6/1995 | Jones |
| 5,469,830 A | 11/1995 | Gonzalez |
| 5,516,967 A | 5/1996 | Pandey |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,628,351 A | 5/1997 | Ramsey, Jr. et al. |
| 5,660,602 A | 8/1997 | Collier, Jr. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,220,747 B1 | 4/2001 | Gosselin |
| 6,243,483 B1 | 6/2001 | Petrou et al. |
| 6,328,877 B1 | 12/2001 | Bushman |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,121,040 B2 | 10/2006 | Wiese |
| 7,168,464 B2 | 1/2007 | Diggins |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,616,760 B2 | 12/2013 | Williams et al. |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,912,924 B2 | 12/2014 | Scofield et al. |
| 8,979,982 B2 | 3/2015 | Jordan et al. |
| 9,038,855 B2 | 5/2015 | Lurcott et al. |
| 9,162,944 B2 | 10/2015 | Bennett et al. |

(56) References Cited

U.S. PATENT DOCUMENTS

| | | | |
|---|---|---|---|
| 9,175,235 B2 | 11/2015 | Kastner | |
| 9,222,480 B2 | 12/2015 | Younes et al. | |
| 9,310,016 B2 | 4/2016 | Hodde | |
| 9,329,066 B2 | 5/2016 | Skarping | |
| 9,363,462 B2 * | 6/2016 | Yoel | G06F 16/29 |
| 9,388,350 B2 | 7/2016 | Buchanan | |
| 9,497,956 B2 | 11/2016 | Dubose | |
| 9,518,693 B2 | 12/2016 | Hodde | |
| 9,530,121 B2 | 12/2016 | Brauer et al. | |
| 9,550,247 B2 | 1/2017 | Smith | |
| 9,643,135 B1 | 5/2017 | Mazzei et al. | |
| 9,945,333 B2 | 4/2018 | Kopinsky | |
| 10,001,240 B1 | 6/2018 | Dray et al. | |
| 10,012,340 B1 | 7/2018 | Dray et al. | |
| 10,024,768 B1 | 7/2018 | Johnsen | |
| 10,094,508 B1 | 10/2018 | Dray et al. | |
| 10,134,042 B1 | 11/2018 | Prasad et al. | |
| 10,168,255 B1 | 1/2019 | Johnsen | |
| 10,196,243 B1 | 2/2019 | Wells | |
| 10,197,206 B1 | 2/2019 | Dray et al. | |
| 10,223,596 B1 | 3/2019 | Edwards et al. | |
| 10,247,643 B1 | 4/2019 | Johnsen | |
| 10,261,279 B1 | 4/2019 | Potter | |
| 10,287,940 B2 | 5/2019 | Tonsich | |
| 10,345,221 B1 | 7/2019 | Silverman | |
| 10,364,718 B2 | 7/2019 | Eddaoudi et al. | |
| 10,386,260 B2 | 8/2019 | Dudek | |
| 10,405,475 B2 | 9/2019 | Goda | |
| 10,408,377 B1 | 9/2019 | Dray et al. | |
| 10,486,946 B1 | 11/2019 | Wells | |
| 10,501,385 B1 | 12/2019 | Buckner et al. | |
| 10,563,555 B2 | 2/2020 | Hamad | |
| 10,570,581 B2 | 2/2020 | Faivre | |
| 10,605,144 B2 | 3/2020 | Kobayashi | |
| 10,633,830 B2 | 4/2020 | Shibamori | |
| 10,655,774 B1 | 5/2020 | Dray et al. | |
| 10,657,443 B2 | 5/2020 | Araujo et al. | |
| 10,688,686 B2 | 6/2020 | Fadhel et al. | |
| 10,756,459 B2 | 8/2020 | Jongsma | |
| 10,833,434 B1 | 11/2020 | Tassell, Jr. | |
| 10,943,357 B2 | 3/2021 | Badawy et al. | |
| 10,948,471 B1 | 3/2021 | MacMullin et al. | |
| 10,953,960 B1 | 3/2021 | Sharp | |
| 10,962,437 B1 | 3/2021 | Nottrott et al. | |
| 10,970,927 B2 | 4/2021 | Sharp | |
| 10,990,114 B1 | 4/2021 | Miller | |
| 10,997,707 B1 | 5/2021 | Katz et al. | |
| 11,010,608 B2 * | 5/2021 | Adam | G06F 16/29 |
| 11,027,304 B2 | 6/2021 | Donaldson | |
| 11,112,308 B2 | 9/2021 | Kreitinger et al. | |
| 11,125,391 B2 | 9/2021 | Al Khowaiter et al. | |
| 11,132,008 B2 | 9/2021 | Miller | |
| 11,164,406 B2 | 11/2021 | Meroux et al. | |
| 11,221,107 B2 | 1/2022 | Du et al. | |
| 11,247,184 B2 | 2/2022 | Miller | |
| 11,320,519 B2 | 5/2022 | Koivuranta | |
| 11,325,687 B1 | 5/2022 | Sharp | |
| 11,332,070 B2 | 5/2022 | Holden et al. | |
| 11,345,455 B2 | 5/2022 | Sharp | |
| 11,416,012 B2 | 8/2022 | Miller | |
| 11,428,600 B2 | 8/2022 | Dankers et al. | |
| 11,428,622 B2 | 8/2022 | Borin et al. | |
| 11,441,088 B2 | 9/2022 | Robbins | |
| 11,447,877 B1 | 9/2022 | Ell | |
| 11,559,774 B2 | 1/2023 | Miller | |
| 11,565,221 B2 | 1/2023 | Miller | |
| 11,578,638 B2 | 2/2023 | Thobe | |
| 11,578,836 B2 | 2/2023 | Thobe | |
| 11,596,910 B2 | 3/2023 | Miller | |
| 11,607,654 B2 | 3/2023 | Miller | |
| 11,655,748 B1 | 5/2023 | Thobe | |
| 11,655,940 B2 | 5/2023 | Thobe | |
| 11,662,750 B2 | 5/2023 | Miller | |
| 11,686,070 B1 | 6/2023 | Jordan et al. | |
| 11,687,858 B2 | 6/2023 | Rentz | |
| 11,715,950 B2 | 8/2023 | Miller et al. | |
| 11,720,526 B2 | 8/2023 | Miller et al. | |
| 11,739,679 B2 | 8/2023 | Thobe | |
| 11,752,472 B2 | 9/2023 | Miller | |
| 11,754,225 B2 | 9/2023 | Thobe | |
| 11,761,366 B2 | 9/2023 | Thobe | |
| 11,774,042 B2 | 10/2023 | Thobe | |
| 11,789,453 B2 | 10/2023 | Chowdhary | |
| 11,794,153 B2 | 10/2023 | Miller | |
| 11,807,945 B2 | 11/2023 | Ell | |
| 11,808,013 B1 | 11/2023 | Jordan et al. | |
| 11,815,227 B2 | 11/2023 | Thobe | |
| 11,842,538 B2 | 12/2023 | Saxena | |
| 11,920,504 B2 | 3/2024 | Thobe | |
| 11,965,317 B2 | 4/2024 | Jordan | |
| 11,988,336 B2 | 5/2024 | Thobe | |
| 12,000,538 B2 | 6/2024 | Thobe | |
| 12,006,014 B1 | 6/2024 | Ernst | |
| 12,011,697 B2 | 6/2024 | Miller | |
| 12,012,082 B1 | 6/2024 | Pittman, Jr. | |
| 12,012,883 B2 | 6/2024 | Thobe | |
| 12,043,361 B1 | 7/2024 | Ernst | |
| 12,043,905 B2 | 7/2024 | Ell | |
| 12,043,906 B2 | 7/2024 | Ell | |
| 12,066,843 B2 | 8/2024 | Miller | |
| 12,087,002 B1 | 9/2024 | Miller et al. | |
| 12,109,543 B2 | 10/2024 | Miller | |
| 12,128,369 B2 | 10/2024 | Miller | |
| 12,129,559 B2 | 10/2024 | Ell | |
| 12,163,625 B2 | 12/2024 | Thobe | |
| 12,180,597 B2 | 12/2024 | Ell | |
| 2001/0013517 A1 | 8/2001 | Hart | |
| 2002/0014068 A1 | 2/2002 | Mittricker et al. | |
| 2002/0178806 A1 | 12/2002 | Valentine | |
| 2002/0185180 A1 | 12/2002 | Smith | |
| 2003/0041518 A1 | 3/2003 | Wallace et al. | |
| 2003/0121481 A1 | 7/2003 | Dodd et al. | |
| 2003/0158630 A1 | 8/2003 | Pham et al. | |
| 2003/0167660 A1 | 9/2003 | Kondou | |
| 2003/0178994 A1 | 9/2003 | Hurlimann et al. | |
| 2003/0188536 A1 | 10/2003 | Mittricker | |
| 2003/0197622 A1 | 10/2003 | Reynard et al. | |
| 2003/0227821 A1 | 12/2003 | Bae et al. | |
| 2004/0057334 A1 | 3/2004 | Wilmer et al. | |
| 2004/0058597 A1 | 3/2004 | Matsuda | |
| 2004/0067126 A1 | 4/2004 | Schmidt | |
| 2004/0125688 A1 | 7/2004 | Kelley et al. | |
| 2004/0249105 A1 | 12/2004 | Nolte et al. | |
| 2004/0251313 A1 | 12/2004 | Burgess | |
| 2004/0265653 A1 | 12/2004 | Buechi et al. | |
| 2005/0007450 A1 | 1/2005 | Hill et al. | |
| 2005/0058016 A1 | 3/2005 | Smith et al. | |
| 2005/0146437 A1 | 7/2005 | Ward | |
| 2005/0150820 A1 | 7/2005 | Guo | |
| 2005/0154132 A1 | 7/2005 | Hakuta et al. | |
| 2005/0176482 A1 | 8/2005 | Raisinghani et al. | |
| 2005/0284333 A1 | 12/2005 | Falkiewicz | |
| 2006/0125826 A1 | 6/2006 | Lubkowitz | |
| 2006/0263283 A1 | 11/2006 | Egan | |
| 2006/0278304 A1 | 12/2006 | Mattingly et al. | |
| 2007/0175511 A1 | 8/2007 | Doerr | |
| 2007/0181083 A1 | 8/2007 | Fulton | |
| 2008/0092625 A1 | 4/2008 | Hinrichs | |
| 2008/0113884 A1 | 5/2008 | Campbell et al. | |
| 2008/0115834 A1 | 5/2008 | Geoffrion et al. | |
| 2008/0149481 A1 | 6/2008 | Hurt | |
| 2008/0283083 A1 | 11/2008 | Piao | |
| 2009/0009308 A1 | 1/2009 | Date et al. | |
| 2009/0107111 A1 | 4/2009 | Oliver | |
| 2009/0154288 A1 | 6/2009 | Heathman | |
| 2009/0175738 A1 | 7/2009 | Shaimi | |
| 2009/0183498 A1 | 7/2009 | Uchida et al. | |
| 2009/0188565 A1 | 7/2009 | Satake | |
| 2009/0197489 A1 | 8/2009 | Caro | |
| 2009/0278839 A1 | 11/2009 | Geis | |
| 2010/0031825 A1 | 2/2010 | Kemp | |
| 2010/0049410 A1 | 2/2010 | McKee | |
| 2010/0058666 A1 | 3/2010 | Kim | |
| 2010/0175316 A1 | 7/2010 | Kubacak | |

(56) References Cited

U.S. PATENT DOCUMENTS

| | | | |
|---|---|---|---|
| 2010/0198775 A1* | 8/2010 | Rousselle | A01B 79/005 |
| | | | 706/54 |
| 2011/0265449 A1 | 11/2011 | Powell | |
| 2012/0027298 A1* | 2/2012 | Dow | H04N 7/18 |
| | | | 382/173 |
| 2012/0092835 A1 | 4/2012 | Miller | |
| 2012/0143560 A1 | 6/2012 | Tabet et al. | |
| 2012/0153042 A1 | 6/2012 | Oedekoven | |
| 2012/0185220 A1 | 7/2012 | Shippen | |
| 2012/0276379 A1 | 11/2012 | Daniels et al. | |
| 2012/0304625 A1 | 12/2012 | Daikoku | |
| 2013/0035824 A1 | 2/2013 | Nakamura | |
| 2013/0048094 A1 | 2/2013 | Ballantyne | |
| 2013/0062258 A1 | 3/2013 | Ophus | |
| 2013/0125323 A1 | 5/2013 | Henderson | |
| 2013/0176656 A1 | 7/2013 | Kaisser | |
| 2013/0186671 A1 | 7/2013 | Theis | |
| 2013/0201025 A1 | 8/2013 | Kamalakannan et al. | |
| 2013/0245524 A1 | 9/2013 | Schofield | |
| 2013/0293884 A1 | 11/2013 | Lee et al. | |
| 2013/0299500 A1 | 11/2013 | McKinnon | |
| 2013/0317959 A1 | 11/2013 | Joos | |
| 2014/0002639 A1 | 1/2014 | Cheben et al. | |
| 2014/0008926 A1 | 1/2014 | Allen | |
| 2014/0062490 A1 | 3/2014 | Neuman et al. | |
| 2014/0090379 A1 | 4/2014 | Powell et al. | |
| 2014/0121622 A1 | 5/2014 | Jackson et al. | |
| 2014/0133824 A1 | 5/2014 | Yoel | |
| 2014/0158616 A1 | 6/2014 | Govind et al. | |
| 2014/0158632 A1 | 6/2014 | Govind et al. | |
| 2014/0171538 A1 | 6/2014 | Daniels et al. | |
| 2014/0172513 A1 | 6/2014 | MacLean | |
| 2014/0176344 A1 | 6/2014 | Littlestar | |
| 2014/0190691 A1 | 7/2014 | Vinegar | |
| 2014/0194657 A1 | 7/2014 | Wadhwa et al. | |
| 2014/0299039 A1 | 10/2014 | Trollux | |
| 2014/0345370 A1 | 11/2014 | Marotta | |
| 2014/0356707 A1 | 12/2014 | Kwon et al. | |
| 2015/0081165 A1 | 3/2015 | Yamashita et al. | |
| 2015/0144468 A1 | 5/2015 | Skolozdra | |
| 2015/0183102 A1 | 7/2015 | Breschi et al. | |
| 2015/0198518 A1 | 7/2015 | Borin et al. | |
| 2015/0244087 A1 | 8/2015 | Wing | |
| 2015/0269288 A1 | 9/2015 | Moore | |
| 2015/0323119 A1 | 11/2015 | Giunta | |
| 2016/0071059 A1 | 3/2016 | Petering | |
| 2016/0091467 A1 | 3/2016 | Morris | |
| 2016/0139355 A1 | 5/2016 | Petersen | |
| 2016/0169098 A1 | 6/2016 | Makita | |
| 2016/0169436 A1 | 6/2016 | Sander et al. | |
| 2016/0175634 A1 | 6/2016 | Radian | |
| 2016/0238194 A1 | 8/2016 | Adler et al. | |
| 2016/0252650 A1 | 9/2016 | Hirst, Sr. | |
| 2016/0363249 A1 | 12/2016 | Disher | |
| 2016/0369930 A1 | 12/2016 | Poe et al. | |
| 2017/0051472 A1 | 2/2017 | Mochimaru | |
| 2017/0088401 A1 | 3/2017 | Clements et al. | |
| 2017/0122174 A1 | 5/2017 | Patel | |
| 2017/0131728 A1 | 5/2017 | Lambert et al. | |
| 2017/0140237 A1 | 5/2017 | Voeller et al. | |
| 2017/0158303 A1 | 6/2017 | Michaelis et al. | |
| 2017/0180012 A1 | 6/2017 | Tingler et al. | |
| 2017/0248569 A1 | 8/2017 | Lambert et al. | |
| 2017/0253737 A1 | 9/2017 | Auld et al. | |
| 2017/0253738 A1 | 9/2017 | Auld et al. | |
| 2017/0253806 A1 | 9/2017 | Auld et al. | |
| 2017/0254481 A1 | 9/2017 | Cadogan et al. | |
| 2017/0259229 A1 | 9/2017 | Chou et al. | |
| 2017/0306428 A1 | 10/2017 | Helgason et al. | |
| 2017/0326474 A1 | 11/2017 | Olovsson | |
| 2017/0367346 A1 | 12/2017 | Rees et al. | |
| 2018/0002617 A1 | 1/2018 | Umansky et al. | |
| 2018/0003116 A1 | 1/2018 | Fersman et al. | |
| 2018/0037452 A1 | 2/2018 | Gray et al. | |
| 2018/0080356 A1 | 3/2018 | Fukui | |
| 2018/0098137 A1* | 4/2018 | Saha | G06Q 10/20 |
| 2018/0119882 A1 | 5/2018 | Allidieres et al. | |
| 2018/0143734 A1 | 5/2018 | Ochenas et al. | |
| 2018/0186528 A1 | 7/2018 | Tonn | |
| 2018/0218214 A1* | 8/2018 | Pestun | G06V 20/176 |
| 2018/0223202 A1 | 8/2018 | Fransham et al. | |
| 2018/0245313 A1 | 8/2018 | Shibamori et al. | |
| 2018/0259064 A1 | 9/2018 | McLemore | |
| 2018/0312391 A1 | 11/2018 | Borg | |
| 2019/0016963 A1 | 1/2019 | Auld et al. | |
| 2019/0121373 A1 | 4/2019 | Panigrahi | |
| 2019/0136060 A1 | 5/2019 | Helgason et al. | |
| 2019/0270500 A1 | 9/2019 | Hamaoka | |
| 2019/0295189 A1 | 9/2019 | Strasser | |
| 2019/0338203 A1 | 11/2019 | Umansky et al. | |
| 2019/0359899 A1 | 11/2019 | Umansky et al. | |
| 2019/0362147 A1* | 11/2019 | Adam | B61L 23/041 |
| 2019/0367732 A1 | 12/2019 | Helgason et al. | |
| 2019/0368054 A1 | 12/2019 | Gummow et al. | |
| 2019/0368156 A1 | 12/2019 | Faivre | |
| 2020/0033252 A1 | 1/2020 | Borin et al. | |
| 2020/0118413 A1 | 4/2020 | Kanukurthy et al. | |
| 2020/0232191 A1 | 7/2020 | Prior | |
| 2020/0235559 A1 | 7/2020 | Neuenschwander | |
| 2020/0240588 A1 | 7/2020 | Al Khowaiter | |
| 2020/0245551 A1 | 8/2020 | Hoffman et al. | |
| 2020/0245552 A1 | 8/2020 | Hoffman et al. | |
| 2020/0245553 A1 | 8/2020 | Hoffman et al. | |
| 2020/0292445 A1 | 9/2020 | Morimoto | |
| 2020/0325742 A1 | 10/2020 | Astudillo et al. | |
| 2021/0053011 A1 | 2/2021 | Sugiyama et al. | |
| 2021/0062697 A1 | 3/2021 | Yokoyama et al. | |
| 2021/0073692 A1* | 3/2021 | Saha | B64F 1/362 |
| 2021/0076006 A1 | 3/2021 | O'Neill et al. | |
| 2021/0095380 A1 | 4/2021 | Borin et al. | |
| 2021/0123211 A1 | 4/2021 | Miller et al. | |
| 2021/0138399 A1 | 5/2021 | Yokoyama et al. | |
| 2021/0192938 A1 | 6/2021 | Doerr et al. | |
| 2021/0197151 A1 | 7/2021 | Miller | |
| 2021/0207772 A1 | 7/2021 | Norton et al. | |
| 2021/0215925 A1 | 7/2021 | Kim et al. | |
| 2021/0216852 A1 | 7/2021 | Reece et al. | |
| 2021/0232163 A1 | 7/2021 | Miller | |
| 2021/0232741 A1 | 7/2021 | Ogiso et al. | |
| 2021/0232818 A1* | 7/2021 | Saxena | G06V 20/52 |
| 2021/0348281 A1 | 11/2021 | da Costa | |
| 2021/0362637 A1 | 11/2021 | Hanis et al. | |
| 2021/0381920 A1 | 12/2021 | Jacobsz et al. | |
| 2022/0001969 A1 | 1/2022 | Pugnetti | |
| 2022/0010707 A1 | 1/2022 | Sharma et al. | |
| 2022/0048606 A1 | 2/2022 | Singh | |
| 2022/0081261 A1 | 3/2022 | Karbassi | |
| 2022/0087099 A1 | 3/2022 | Hoffman et al. | |
| 2022/0154427 A1 | 5/2022 | Misaki | |
| 2022/0178114 A1 | 6/2022 | Takahama | |
| 2022/0183208 A1 | 6/2022 | Sibley | |
| 2022/0186470 A1 | 6/2022 | Chiba et al. | |
| 2022/0213603 A1 | 7/2022 | Al Eid et al. | |
| 2022/0221368 A1 | 7/2022 | Bergeron | |
| 2022/0228345 A1 | 7/2022 | Case et al. | |
| 2022/0282651 A1 | 9/2022 | Reynolds et al. | |
| 2022/0290411 A1 | 9/2022 | Anahara et al. | |
| 2022/0343229 A1 | 10/2022 | Gruber et al. | |
| 2022/0401899 A1 | 12/2022 | Miller | |
| 2022/0404272 A1 | 12/2022 | Kendall et al. | |
| 2022/0405870 A1 | 12/2022 | Conway | |
| 2023/0012038 A1 | 1/2023 | Iyer | |
| 2023/0012673 A1 | 1/2023 | Fukuyama et al. | |
| 2023/0015077 A1 | 1/2023 | Kim | |
| 2023/0061824 A1 | 3/2023 | Ell | |
| 2023/0078852 A1 | 3/2023 | Campbell et al. | |
| 2023/0129513 A1 | 4/2023 | Miller | |
| 2023/0259080 A1 | 8/2023 | Whikehart et al. | |
| 2023/0259088 A1 | 8/2023 | Borup et al. | |
| 2023/0332532 A1 | 10/2023 | Thobe | |
| 2023/0333577 A1 | 10/2023 | Miller | |
| 2023/0333578 A1 | 10/2023 | Miller | |
| 2023/0338897 A1 | 10/2023 | Bednar | |
| 2023/0341092 A1 | 10/2023 | Thobe | |

(56)  References Cited

U.S. PATENT DOCUMENTS

| | | |
|---|---|---|
| 2023/0347303 A1 | 11/2023 | Miller |
| 2023/0358023 A1 | 11/2023 | Jordan et al. |
| 2023/0360151 A1 | 11/2023 | Swamy |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Eii |
| 2024/0060189 A1 | 2/2024 | Ell |
| 2024/0071073 A1 | 2/2024 | Rajora |
| 2024/0141506 A1 | 5/2024 | Ell |
| 2024/0166492 A1 | 5/2024 | Thobe |
| 2024/0209988 A1 | 6/2024 | Thobe |
| 2024/0217498 A1 | 7/2024 | Pittman, Jr. |
| 2024/0255102 A1 | 8/2024 | Thobe |
| 2024/0269626 A1 | 8/2024 | Miller |
| 2024/0271556 A1 | 8/2024 | Thobe |
| 2024/0278762 A1 | 8/2024 | Pittman, Jr. |
| 2024/0278894 A1 | 8/2024 | Ernst |
| 2024/0286726 A1 | 8/2024 | Ernst |
| 2024/0301811 A1 | 9/2024 | Thobe |
| 2024/0327992 A1 | 10/2024 | Ell |
| 2024/0327993 A1 | 10/2024 | Ell |

FOREIGN PATENT DOCUMENTS

| | | | |
|---|---|---|---|
| AU | 2009202785 B | | 11/2014 |
| CA | 2447358 | | 4/2005 |
| CA | 2702151 | | 10/2007 |
| CA | 2637421 | | 1/2010 |
| CA | 2642295 | | 1/2010 |
| CA | 2736733 | | 10/2011 |
| CA | 2958443 | | 4/2017 |
| CA | 2995532 | | 4/2017 |
| CA | 2916141 | | 6/2017 |
| CN | 2092562 | | 1/1992 |
| CN | 200958686 | | 10/2007 |
| CN | 100348970 | | 11/2007 |
| CN | 102997052 | | 3/2013 |
| CN | 202898548 U | | 4/2013 |
| CN | 103106764 | | 5/2013 |
| CN | 103497804 | | 1/2014 |
| CN | 102997061 | | 5/2015 |
| CN | 204824775 | | 12/2015 |
| CN | 205640252 | | 10/2016 |
| CN | 104372350 B | | 2/2017 |
| CN | 106764463 | | 1/2019 |
| CN | 208306600 | | 1/2019 |
| CN | 110513604 | | 11/2019 |
| CN | 210176958 | | 3/2020 |
| CN | 111537157 | | 8/2020 |
| CN | 113239445 A | | 8/2021 |
| CN | 114001278 | | 2/2022 |
| CN | 113719746 | | 11/2022 |
| CN | 115325460 A | | 11/2022 |
| CN | 114877263 | | 4/2023 |
| CN | 220458389 U | | 2/2024 |
| EP | 2458573 | | 5/2012 |
| EP | 2586304 A1 | | 5/2013 |
| EP | 2602609 | | 6/2013 |
| EP | 3076461 | | 10/2016 |
| EP | 3101411 | | 12/2016 |
| EP | 3112011 | | 1/2017 |
| EP | 2994626 | | 1/2018 |
| EP | 3285759 | | 2/2018 |
| ES | 2398302 | | 3/2013 |
| FR | 2388762 | | 11/1978 |
| FR | 2689241 | | 10/1993 |
| GB | 1179978 | | 2/1970 |
| GB | 2097687 | | 11/1982 |
| GB | 2545207 | | 6/2017 |
| GB | 2559149 | | 4/2022 |
| IN | 202141001384 | | 1/2021 |
| IT | 201900008235 | | 12/2020 |
| JP | 2004125039 | | 4/2004 |
| JP | 2007204023 | | 8/2007 |
| JP | 2008097832 | | 4/2008 |
| JP | 2012002159 | | 11/2014 |
| JP | 2016078893 | | 5/2016 |
| JP | 7146271 B2 | | 10/2022 |
| KR | 20110010316 | | 2/2011 |
| KR | 20130038986 | | 4/2013 |
| KR | 20200007444 A | | 1/2020 |
| KR | 102129951 | | 7/2020 |
| KR | 102169280 | | 10/2020 |
| KR | 102281640 | | 7/2021 |
| KR | 102478341 B1 | | 12/2022 |
| RU | 2760879 | | 12/2021 |
| RU | 217534 U1 | | 4/2023 |
| WO | 1996006685 | | 5/1996 |
| WO | 1997006004 | | 2/1997 |
| WO | 1997006298 | | 2/1997 |
| WO | 1998003711 | | 1/1998 |
| WO | 199917606 | | 4/1999 |
| WO | 2000063108 | | 10/2000 |
| WO | 2002030551 | | 4/2002 |
| WO | 2002082181 | | 10/2002 |
| WO | 2003003002 | | 1/2003 |
| WO | 2003066423 | | 8/2003 |
| WO | 2004003293 | | 1/2004 |
| WO | 2004092307 | | 10/2004 |
| WO | 2005018300 | | 3/2005 |
| WO | 2007107652 | | 9/2007 |
| WO | 2007112335 | | 10/2007 |
| WO | 2007149851 | | 12/2007 |
| WO | 2009013544 | | 1/2009 |
| WO | 2009055024 | | 4/2009 |
| WO | 2010002274 | | 1/2010 |
| WO | 2010042704 | | 4/2010 |
| WO | 2010103260 | | 9/2010 |
| WO | 2011127535 | | 10/2011 |
| WO | 2013112274 | | 8/2013 |
| WO | 2014089443 | | 6/2014 |
| WO | 2014173672 | | 10/2014 |
| WO | 2015061868 | | 5/2015 |
| WO | 2015153607 | | 10/2015 |
| WO | 2016004107 | | 1/2016 |
| WO | 2016026043 | | 2/2016 |
| WO | 2016146404 | | 9/2016 |
| WO | 2017074985 | | 5/2017 |
| WO | 2017083778 | | 5/2017 |
| WO | 2017087731 | | 5/2017 |
| WO | 2017152269 | | 9/2017 |
| WO | 2018005141 | | 1/2018 |
| WO | 2018102378 | | 6/2018 |
| WO | 2020044026 | | 3/2020 |
| WO | 2020118020 | | 6/2020 |
| WO | 2020132632 | | 6/2020 |
| WO | 2020223803 | | 11/2020 |
| WO | 2020237112 | | 11/2020 |
| WO | 2021062563 | | 4/2021 |
| WO | 2021100054 | | 5/2021 |
| WO | 2021154891 | | 8/2021 |
| WO | 2022043197 | | 3/2022 |
| WO | 2022126092 | | 6/2022 |
| WO | 2022149501 | | 7/2022 |
| WO | 2022269052 | | 12/2022 |
| WO | 2023287276 | | 1/2023 |
| WO | 2023021769 | | 2/2023 |
| WO | 2023038579 | | 3/2023 |
| WO | 2023060350 | | 4/2023 |
| WO | 2023137304 | | 7/2023 |
| WO | 2023164683 | | 8/2023 |

(56)          References Cited

FOREIGN PATENT DOCUMENTS

| | | |
|---|---|---|
| ZA | 9606765 | 2/1998 |
| ZA | 200610366 | 1/2008 |

OTHER PUBLICATIONS

Paschal, Kayla. "Utility Right of Way Management: Potential for Expanded Integrated Vegetation Managment in California." (2014). (Year: 2014).*

Mongus, Domen, et al. "A Complete Environmental Intelligence System for LiDAR-Based Vegetation Management in Power-Line Corridors." Remote Sensing 13.24 (2021): 5159. (Year: 2021).*

Neutrik XXR-2 XX Series, https://www.parts-express.com/Neutrik-XXR-2-XX-Series-Color-Coding_Ring-Red, 2022.

Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.

Skelton et al., Onboard Refueling Vapor Recovery Systems Analysis of Widespread Use,Nescaum, Boston MA, Aug. 20, 2007.

Membrane Technology and Research, Inc., Gasoline Vapor Recovery, 2018.

Jordan Technologies, Aereon, Recovering More Vapor = Increased Profits, 2015.

EPFL, Capturing CO2 from trucks and reducing their emissions by 90%, Dec. 23, 2019.

Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.

Information Disclosure Declaration by Kyle E. Miller, Dec. 18, 2020.

Cott Manufacturing Company, FinkLet®/FinkPlate® Cathodic Proection Test Stations, Wayback Machine, May 22, 2000.

Alexandrakis et al., "Marine Transportation for Carbon Capture and Sequestration (CCS)", Department of Civil and Environmental Engineering, Thesis, Massachusetts Institute of Technology, Jun. 2010.

Datta et al., "Advancing carbon management through the global commoditization of CO2: the case for dual-use LNG-CO2 shipping", Carbon Management, 2020, vol. 11, No. 6, 611-630.

Ibitoye et al., "Poster Abstract: A Convolutional Neural Network Based Solution for Pipeline Leak Detection", School of Information Technology, Carleton University, Ottawa, Canada, Nov. 2019.

Intelliview, "Thermal Imaging Provides Early Leak Detection in Oil and Gas Pipelines", Petro Industry News, www.Petro-Online.com, Aug./Sep. 2018.

Southwest Research Institute, "Methane Leak Detection", 2021.

Masterduct, "Case Studies: High temp marine grade ship engine exhaust fume hose", retrieved at https://www.masterduct.com/CaseStudies/Hightempshipengineexhaustfumehose.aspx.

ACTI, "Advanced Maritime Emissions Control System (AMECS)", retrieved at https://sustainableworldports.org/wp-content/uploads/presentation-on-AMECS.pdf.

Lloyd's Register, Using technology to trace the carbon intensity of sustainable marine fuels, Feb. 15, 2023.

Borin Manufacturing, Inc., Dart for Test Station, Above Ground Remote Monitoring, Feb. 11, 2021.

Borin Manufacturing, Inc., Commanche Remote Monitoring and Control System, Mar. 24, 2017.

Borin Manufacturing, Inc., Dart for Rectifiers, Remote Monitoring and Control System. Nov. 1, 2017.

Borin Manufacturing, Inc., Stelth 2 Solid-State Reference Electrode for Buried and Concrete Service, Aug. 7, 2015.

Borin Manufacturing, Inc., Stelth 3, Nov. 10, 2016.

Borin Manufacturing, Inc., Stelth Reference Electrodes, Feb. 4, 2016.

Borin Manufacturing, Inc., Stelth Solid-State Reference Electrodes, Nov. 8, 2016.

Borin Manufacturing, Inc., Stelth Reference Electrodes, Oct. 10, 2017.

Borin Manufacturing, Inc., 'Miracle half-cell', Palladium: Borin's new reference electrode chemistry, Aug. 13, 2014.

Borin Manufacturing, Inc., Street Dart, For Test Station, Ground Level Remote Monitoring, Mar. 2017.

International Search Report and Written Opinion for international application No. PCT/US2024/021099 mailed on Aug. 2, 2024.

International Search Report and Written Opinion for international application No. PCT/US24/44934 mailed on Nov. 28, 2024.

International Search Report and Written Opinion for international application No. PCT/US24/44935 mailed on Dec. 5, 2024.

Huang et al., "3D Autonomous Tracking of Buried Pipelines via a UAV in a Low Altitude", 2018 IEEE 3rd Advanced Information Technology, Electronic and Automation Control Conference (IAEAC), IEEE, Oct. 12, 2018, pp. 1106-1109.

International Search Report and Written Opinion for international application No. PCT/US2024/021101 mailed on Oct. 9, 2024.

Annex to Form PCT/ISA/206, Communication Relating to the Results of the Partial International Search for international application No. PCT/US2024/021101 mailed Aug. 13, 2024.

Written Opinion of the International Preliminary Examining Authority in PCT/US2024/044935, mailed Oct. 9, 2025, 8 pages.

* cited by examiner

300

302 — CONTROLLER

304 — PROCESSOR

306 — MEMORY

308 — IMAGE CAPTURE

310 — MODEL TRAINING

312 — VEGETATION ENCROACHMENT MODELING

314 — IMAGE SENSOR

316 — DATABASE

318 — USER INTERFACE

SYSTEMS AND METHODS TO DETERMINE VEGETATION ENCROACHMENT ALONG A RIGHT-OF-WAY

CROSS-REFERENCE TO RELATED APPLICATION

The present application claims priority to and the benefit of U.S. Provisional Application No. 63/540,822, filed Sep. 27, 2023, titled "SYSTEMS AND METHODS TO DETERMINE DEPTH OF SOIL COVERAGE ALONG A RIGHT-OF-WAY," U.S. Provisional Application No. 63/540,692, filed Sep. 27, 2023, titled "SYSTEMS AND METHODS TO DETERMINE VEGETATION ENCROACHMENT ALONG A RIGHT-OF-WAY," and U.S. Provisional Application No. 63/539,039, filed Sep. 18, 2023, titled "SYSTEMS AND METHODS TO DETERMINE DEPTH OF SOIL COVERAGE ALONG A RIGHT-OF-WAY," the disclosure of which is incorporated herein by reference in their entirety.

FIELD OF DISCLOSURE

The present disclosure relates to systems and methods for determining vegetation migration encroachment along a right-of-way. In particular, the present disclosure relates to systems and methods for determining vegetation encroachment along a right-of-way corresponding to a pipeline (or, in other embodiments, other buried or underground features).

BACKGROUND

Pipeline is positioned throughout various environments worldwide to transport various fluids, such as hydrocarbons and/or renewable hydrocarbons, as well as water and/or other fluids, each in a liquid or gaseous state. For example, hundreds of thousands of miles of pipeline are positioned throughout the United States alone. A majority of such pipeline is buried or underground. Other buried or underground features are positioned worldwide as well, such as utility lines, sewage or septic lines or tanks, tunnels, and/or other various underground features.

Exposure of such pipeline, caused by erosion, weather events, unintentional interference (for example, digging along a right-of-way), and/or vegetation encroachment, may result in damage to or risk of damage to the pipeline or other underground features. A right-of-way has to remain clear of vegetation to ensure that such an exposure or a risk of exposure is detected and to ensure that the vegetation does not physically affect the underground feature. Typically, a person or technician may simply view the right-of-way, in-person, and, based on the knowledge of the person or technician, make a judgment as to whether the vegetation at the right-of-way should be managed (for example, cleared, cut, and/or removed).

SUMMARY

Thus, in view of the foregoing, Applicant has recognized these problems and others in the art, and has recognized a need for enhanced systems and methods for determining vegetation migration encroachment along a right-of-way. In particular, the present disclosure relates to systems and methods for determining vegetation encroachment along a right-of-way corresponding to a pipeline (or, in other embodiments, other buried or underground features).

The disclosure herein provides embodiments of systems and methods for determining vegetation encroachment along a right-of-way quickly (in relation to typical in-person inspections), utilizing less resources, before the vegetation becomes a risk to a pipeline or another underground feature, and/or while reducing the width monitored of a right-of-way buffer.

Such systems and methods may include training a machine learning model or classifier to detect vegetation encroachment along a right-of-way. To train the machine learning model, first, the systems and methods may collect, obtain, or receive historical images of one or more sections of a plurality of rights-of-way including one or more different types of vegetation. The systems and methods may collect the historical images from one or more sources, such as, for example, a database, a computing device, and/or directly from one or more vehicles, the vehicles including one or more image sensors.

Once the historical images are collected, the systems and methods may classify and/or mark up each of the historical images. For example, a user and/or computing device may mark each image to indicate vegetation, overgrown vegetation, encroaching vegetation, encroaching vegetation to be managed, encroaching vegetation to be monitored after a selected amount of time, a canopy, and/or the surface of the right-of-way. Such a marking or classification may include assigning colors to different portions of the images (for example, coloring parts of a canopy determined to be encroaching and/or parts of a canopy nearer to a right-of-way buffer) and/or applying labels to different portions of the drawings. In another embodiment, rather than or in addition to portions of the images being classified, the image itself may be classified (for example, marked as an image that indicates or does not indicate vegetation to be managed).

The systems and methods may include training a machine learning model with a first subset of the marked up and/or classified images, for example, by applying the first subset of marked up and/or classified images to a machine learning algorithm configured to produce or provide a trained machine learning model or classifier. A second subset of images may be utilized to test the trained machine learning model. For example, such training and testing may utilize an 80/20 testing technique. In other words, 80% of the marked up and/or classified images may be utilized to train the machine learning model or classifier (in other words, the first subset), while the remaining 20% of marked up and/or classified images may be utilized to test the trained machine learning model or classifier (in other words, the second subset of images).

The trained machine learning model or classifier may produce or provide a probability or risk associated with vegetation encroachment management and/or a marked up image including risk for different portions of an image when an image or plurality of images are applied thereto. After the trained machine learning model is tested, the resulting output may be compared to a known outcome associated with the second subset of images used to test the trained machine learning model. The second subset of images utilized to test the trained machine learning model may include the unmarked or unclassified version of the second subset of images, and the output of the trained machine learning model may be compared to the known outcome, as determined based on the marked up or classified versions of the second subset of images. In another embodiment, such training and testing cycles may be iterative, until a selected accuracy of prediction has been reached.

Once a trained machine learning model has been generated, the systems and methods may include capturing images of one or more sections of a selected right-of-way during a first selected time period. The systems and methods may, in some embodiments, capture images of different sections of a right-of-way at different time periods or intervals. For example, some sections of a right-of-way may not experience risk associated with vegetation encroachment, as little to no vegetation may exist at that section and/or as the vegetation that does exist would not put the underground feature at risk or prevent monitoring of the right-of-way. Thus, image capture may occur less frequently. Other sections may include various types of vegetation, such as trees, grass, shrubs, and/or other vegetation that may obscure a right-of-way, which may prevent monitoring of the right-of-way, thus image capture may occur more frequently. While the vegetation may not, in some embodiments, cause a direct risk to an underground feature, the vegetation may obscure the right-of-way, thus preventing aerial images of the right-of-way from being captured.

Once the images are captured, the systems and methods may georeference those images. In such embodiments, the captured images may include location data. Further, the images may include known identifiers or references associated with a section of the right-of-way. Using this data, the systems and methods may georeference the images. In other words, coordinates may be assigned to an image, enabling the systems and methods to correlate actual areas of the right-of-way with other values in other images, models, and/or measurements.

The systems and methods may then determine an area of interest in the images. For example, a captured image may include portions that are not near the right-of-way and/or include areas of the right-of-way that could not be affected by vegetation encroachment (for example, no vegetation grows near the right-of-way). Those particular portions may not be considered an area of interest. Further, an area of interest may be determined based on the geographical location of portions of the image and/or based on previously known areas of interest. Once an area of interest is determined, the systems and methods may clip the area of interest from the images. Finally, the systems and methods may tile the clipped images or, in other words, size the image based on selected sizes utilized by the trained machine learning model. In an embodiment, the steps of georeferencing, determining areas of interest, clipping, and/or tiling may be considered pre-processing. Pre-processing the images, prior to application to the trained machine learning model, may include other steps or sub-processes.

Once an image has been pre-processed, the systems and methods may apply the image to the trained machine learning model. Such application may determine whether the vegetation captured in the image is encroaching upon the right-of-way. Further, the such an application may produce or provide a probability associated with vegetation encroachment, a risk of vegetation encroachment, images highlighting the vegetation encroachment, images indicating the location of vegetation encroachment, and/or highlighting a portion of the image to indicate vegetation to be managed. In another embodiment, if the systems and methods determine that the vegetation is encroaching upon a right-of-way or that vegetation encroachment exceeds a selected threshold, then the systems and methods may generate an alert indicating the severity of such vegetation encroachment and/or remedial actions.

Thus, such systems and methods may quickly determine whether vegetation is encroaching upon a right-of-way using less resources and/or direct technicians to such a location to manage the vegetation to prevent further issues and allow for continued monitoring of the right-of-way. Such systems and methods may provide targeted vegetation management, rather than sending technicians to portions of a right-of-way based on time rather than based on a determination that a portion of the right-of-way includes vegetation encroachment.

Accordingly, an embodiment of the disclosure is directed to a method to determine vegetation migration encroachment along a pipeline right-of-way. The method may include capturing images of one or more sections of the pipeline right-of-way during a first selected time period. The method may include georeferencing the images to correlate the images with a surface of a geographical location of the pipeline right-of-way. The method may include determining an area of interest for the images based on one or more of the geographical location of the pipeline right-of-way or previously known areas of interest. The method may include clipping the area of interest for the images to define clipped images based on a pipeline right-of-way buffer. The method may include tiling clipped images to a predefined or preselected size to define a plurality of tiled clipped images based on selected sizes utilized by a trained machine learning model. The method may include determining a vegetation migration encroachment onto the pipeline right-of-way by application of the clipped images to the trained machine learning model. The method may include in response to a determination that the vegetation migration encroachment exceeds a threshold, generating an indication of vegetation migration encroachment.

In an embodiment, a controller may store the trained machine learning model (for example, in a memory of the controller). The trained machine learning model may utilize a semantic segmentation algorithm. In such embodiments, the trained machine learning model may (a) determines, via the semantic segmentation algorithm, a category of each pixel in each of the clipped images and (b) determines the vegetation migration encroachment based on the category of each pixel in each of the clipped images. Further, application of the clipped images to the trained machine learning model may produce or provide images with overlayed pre-defined classifications. The classification may comprise one or more of the pipeline right-of-way, one or more types of vegetation, or other objects.

In another embodiment, a size of the tiled clipped images may comprise about 640 by about 640 pixels or about 960 by about 960 pixels. Such a size may be dependent upon input specifications of the trained machine learning model, in other words the trained machine learning model may be configured to analyze an image of a preselected size.

In another embodiment, the area of interest for the images may comprise one or more areas based on one or more of (a) geographic location or (b) a risk associated with the one or more sections of the pipeline right-of-way.

In an embodiment, training the trained machine learning model may include collecting historical images of the one or more sections of the pipeline right-of-way; classifying vegetation and portions of the pipeline right-of-way in the historical images to generate a classified set of historical images; training a machine learning model with a first subset of the classified set of historical images to generate the trained machine learning model; and testing the trained machine learning model with a second subset of the classified set of historical images. Testing the trained machine learning model may produce or provide a model accuracy value. The method may include, in response to the model accuracy value being less than a selected threshold, collecting additional images and re-training the trained machine learning model with the additional images. The method may further include, in response to reception of a marked up vegetation migration encroachment or a validated vegetation migration encroachment, refining the trained machine learning model with one or more of the marked up vegetation migration encroachment or the validated vegetation migration encroachment. In an embodiment, the additional images may include marked up images indicating a type of vegetation encroachment. The type of vegetation encroachment may include one or more of (a) vegetation growing on a surface of the pipeline right-of-way of a selected height or (b) canopy overgrowth along the pipeline right-of-way.

In another embodiment, application of the clipped images to the trained machine learning model may produce or provide one or more of (a) a location and size of vegetation encroachment, (b) spatial data of the pipeline right-of-way, (c) a three dimensional image including polygons indicating vegetation encroachment, (d) a two dimensional image including indicators for vegetation encroachment, or (e) coordinates of vegetation encroachment.

In another embodiment, the indication of vegetation migration encroachment includes an alert. The alert may include a remedial or corrective action. The remedial or corrective action may comprise one or more of (a) cutting branches or trees, (b) mowing a portion of the pipeline right-of-way, or (c) removing other objects blocking the pipeline right-of-way.

In an embodiment, the pipeline right-of-way buffer may comprise about 20 feet and/or up to about 50 feet from a center of the pipeline right-of-way.

Another embodiment of the disclosure is directed to a method to determine vegetation migration encroachment along a right-of-way associated with an underground feature. The method may include capturing images of one or more sections of the right-of-way during a first selected time period. The method may include georeferencing the images to correlate the images with a surface of a geographical location of the right-of-way. The method may include determining an area of interest for the images based on one or more of the geographical location of the right-of-way or previously known areas of interest. The method may include clipping the area of interest for the images to define clipped images based on a right-of-way buffer. The method may include tiling clipped images to a predefined or preselected size to define a plurality of tiled clipped images based on selected sizes utilized by a trained machine learning model. The method may include determining a vegetation migration encroachment onto the right-of-way by application of the clipped images to the trained machine learning model. The method may include, in response to a determination that the vegetation migration encroachment exceeds a threshold, generating an indication of vegetation migration encroachment. In an embodiment, the underground feature comprises one of pipeline, utility lines, sewage or septic lines or tanks, or tunnels.

Another embodiment of the disclosure is directed to a system for managing and determining vegetation encroachment along a pipeline right-of-way. The system may include an image capture circuitry. The image capture circuitry may be configured to receive images of one or more sections of a pipeline right-of-way. The system may include a vegetation encroachment modeling circuitry. The vegetation encroachment modeling circuitry may be configured to pre-process the images based on one or more of a geographic location for each of the images, known areas of interest, or a pipeline right-of-way buffer. The vegetation encroachment modeling circuitry may be configured to apply pre-processed images to a trained machine learning model. The vegetation encroachment modeling circuitry may be configured to determine an output image for each location represented in the images including indications of vegetation encroachment and the pipeline right-of-way. The vegetation encroachment modeling circuitry may be configured to determine whether any vegetation encroachment in any output image exceeds a selected threshold. The vegetation encroachment modeling circuitry may be configured to, in response to any vegetation encroachment exceeding the selected threshold, generate an indication of vegetation migration encroachment including a remedial action.

In an embodiment, the images may be captured and received during a selected time period based on one or more of a location or known inspection interval of one or more sections of the pipeline right-of-way.

In another embodiment, the vegetation encroachment modeling circuitry may be further configured to, based on the output image for each of the one or more sections of the pipeline right-of-way, determine a new selected time period for each corresponding one or more sections of the pipeline right-of-way. In another embodiment, the system may include one or more controllers and the one or more controllers may include the image capture circuitry and the vegetation encroachment modeling circuitry.

Another embodiment of the disclosure is directed to a computing device for determining vegetation encroachment along a pipeline right-of-way, the computing device comprising a processor and a non-transitory computer-readable storage medium storing software instructions that, when executed by the processor, causes the computing device to perform a function, step, or action. The instructions, when executed by the processor, may, in response to reception of images of one or more sections of a pipeline right-of-way from a first selected time period, georeference the images to correlate the images with a surface of a geographical location of the pipeline right-of-way. The instructions, when executed by the processor, may determine an area of interest for the images based on one or more of the geographical location of the pipeline right-of-way, previously known areas of interest, or corresponding selected inspection times. The instructions, when executed by the processor, may clip the area of interest for the images to define clipped images based on a pipeline right-of-way buffer. The instructions, when executed by the processor, may tile clipped images to a predefined or preselected size to define a plurality of tiled clipped images based on selected sizes utilized by a trained machine learning model. The instructions, when executed by the processor, may determine vegetation migration encroachment onto the pipeline right-of-way by application of the clipped images to the trained machine learning model. The instructions, when executed by the processor, may, in response to a determination that the vegetation migration encroachment exceeds a threshold, generate an indication of vegetation migration encroachment.

In an embodiment, the images may be high-resolution aerial images captured by a high-resolution camera on an unmanned aerial vehicle. In an embodiment, the georeferenced image may be accurate within about 95% of actual landscape of the pipeline right-of-way, based on known landmarks and high-resolution image sensors positioned on the unmanned aerial vehicle.

In another embodiment, the indication of vegetation migration encroachment includes images of the pipeline right-of-way overlayed with highlighted areas to indicate vegetation migration encroachment.

In yet another embodiment, the software instructions, when executed by the one or more processors, may, in response to generation of the indication of vegetation migration encroachment: determine a level of the vegetation migration encroachment and, if the level of vegetation migration encroachment exceeds a threshold, generate an alert. The alert may include remedial actions (for example, an indication of where and how to alleviate the vegetation migration encroachment), indication of visual inspection, or a prediction indicating when remedial action may be performed.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the disclosure's scope.

DETAILED DESCRIPTION

Figure 1A:
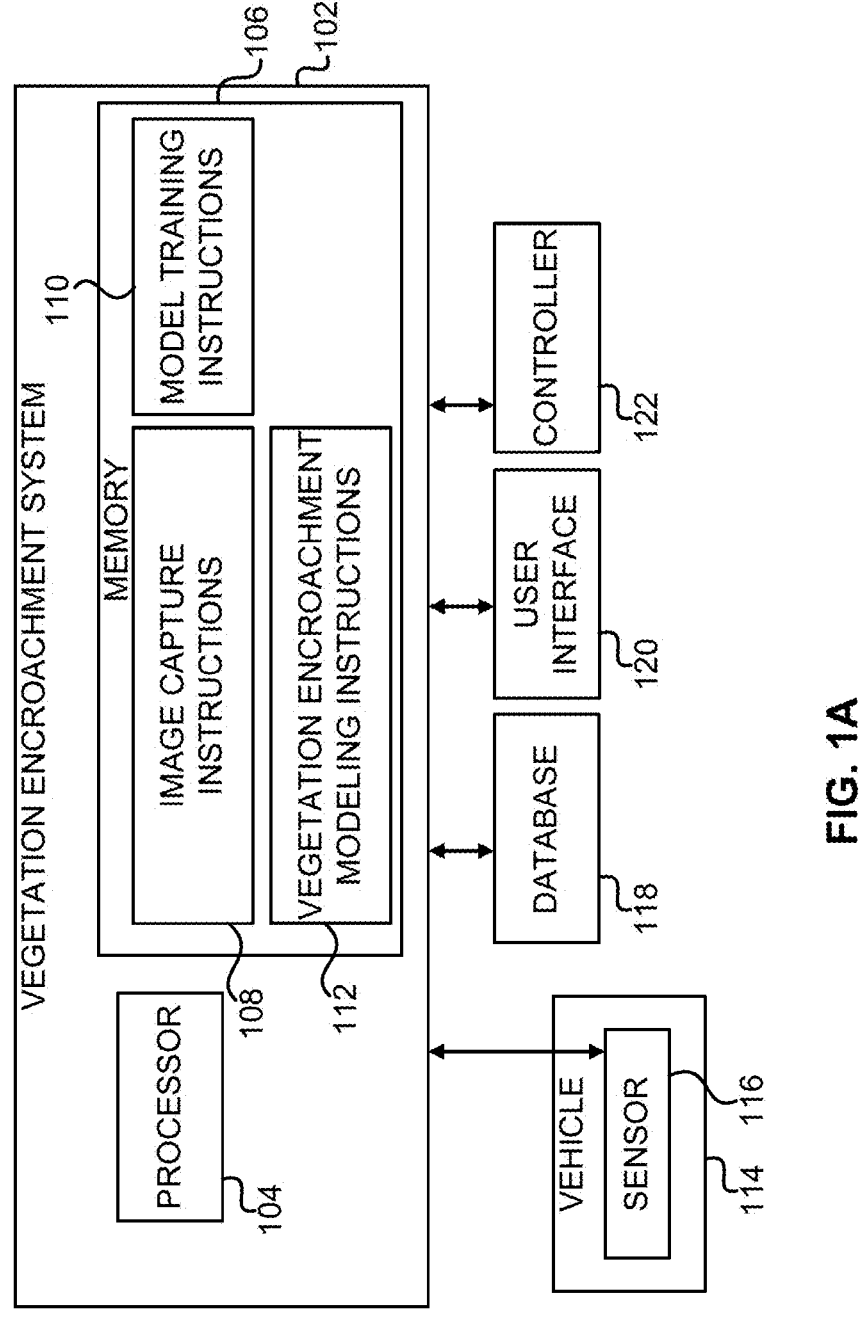
FIG. 1A is a simplified diagram that illustrates a system for determining vegetation encroachment along a right-of-way, according to an embodiment of the disclosure.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. However, it is to be noted that the drawings illustrate only various embodiments of the systems and methods disclosed herein and are therefore not to be considered limiting of the scope of the systems and methods disclosed herein as it may include other effective embodiments as well.

Typically, a technician may travel to a section or portion of a right-of-way to determine whether vegetation has encroached upon the right-of-way. The technician may rely solely upon their knowledge to make such a determination. Other current methods include simply sending a crew or group to the section of the right-of-way to manage the vegetation, regardless of whether vegetation management is required.

Thus, the disclosure herein provides embodiments of systems and methods for determining vegetation encroachment along a right-of-way quicker than sending a person to physically view the right-of-way, utilizing less resources since vegetation encroachment management is targeted, before the vegetation becomes a risk to a pipeline or another underground feature, and/or while reducing the width monitored of a right-of-way buffer allowing for vegetation management to occur less frequently.

Such systems and methods may include training a machine learning model or classifier to detect vegetation encroachment along a plurality of rights-of-way. To train the machine learning model, first, the systems and methods may collect, obtain, or receive historical images (and/or, in other embodiments, currently captured images of the right-of-way) of one or more sections of a plurality of rights-of-way including one or more different types of vegetation. The systems and methods may collect the historical images from one or more sources, such as, for example, a database, a computing device, and/or directly from one or more vehicles, the vehicles including one or more image sensors.

Once the historical images are collected, the systems and methods may classify and/or mark up each of the historical images. For example, a user and/or computing device may mark each image to indicate vegetation, overgrown vegetation, encroaching vegetation, encroaching vegetation to be managed, encroaching vegetation to be monitored after a selected amount of time, a canopy, and/or the surface of the right-of-way. Such a marking or classification may include assigning colors to different portions of the images (for example, coloring parts of a canopy or canopy overgrowth determined to be encroaching and/or parts of a canopy nearer to a right-of-way buffer) and/or applying labels to different portions of the drawings. In another embodiment, rather than or in addition to portions of the images being classified, the image itself may be classified (for example, marked as an image that indicates or does not indicate vegetation to be managed).

The systems and methods may include training a machine learning model with a first subset of the marked up and/or classified images, for example, by applying the first subset of marked up and/or classified images to a machine learning algorithm configured to produce or provide a trained machine learning model or classifier. A second subset of images may be utilized to test the trained machine learning model. For example, such training and testing may utilize an 80/20 testing technique. In other words, 80% of the marked up and/or classified images may be utilized to train the machine learning model or classifier (in other words, the first subset), while the remaining 20% of marked up and/or classified images may be utilized to test the trained machine learning model or classifier (in other words, the second subset of images).

The trained machine learning model or classifier may produce or provide a probability or risk associated with vegetation encroachment management and/or a marked up image including risk for different portions of an image when an image or plurality of images are applied thereto. After the trained machine learning model is tested, the resulting output may be compared to a known outcome associated with the second subset of images used to test the trained machine learning model. The second subset of images utilized to test the trained machine learning model may include the unmarked or unclassified version of the second subset of images, and the output of the trained machine learning model may be compared to the known outcome, as determined based on the marked up or classified versions of the second subset of images. In another embodiment, such training and testing cycles may be iterative, until a selected accuracy of prediction has been reached.

Once a trained machine learning model has been generated, the systems and methods may include capturing images of one or more sections of a selected right-of-way during a first selected time period. The systems and methods may, in some embodiments, capture images of different sections of a right-of-way at different time periods or intervals. For example, some sections of a right-of-way may not experience risk associated with vegetation encroachment, as little to no vegetation may exist at that section and/or as the vegetation that does exist would not put the underground feature at risk or prevent monitoring of the right-of-way. Thus, image capture may occur less frequently. Other sections may include various types of vegetation, such as trees, grass, shrubs, and/or other vegetation that may obscure a right-of-way, which may prevent monitoring of the right-of-way, thus image capture may occur more frequently. While the vegetation may not, in some embodiments, cause a direct risk to an underground feature, the vegetation may obscure the right-of-way, thus preventing aerial images of the right-of-way from being captured.

Once the images are captured, the systems and methods may georeference those images. In such embodiments, the captured images may include location data. Further, the images may include known identifiers or references associated with a section of the right-of-way. Using this data, the systems and methods may georeference the images. In other words, coordinates may be assigned to an image, enabling the systems and methods to correlate actual areas of the right-of-way with other values in other images, models, and/or measurements.

The systems and methods may then determine an area of interest in the images. For example, a captured image may include portions that are not near the right-of-way and/or include areas of the right-of-way that could not be affected by vegetation encroachment (for example, no vegetation grows near the right-of-way). Those particular portions may not be considered an area of interest. Further, an area of interest may be determined based on the geographical location of portions of the image, based on previously known areas of interest, and/or based on corresponding selected inspection times or previous inspection times. Once an area of interest is determined, the systems and methods may clip the area of interest from the images. Finally, the systems and methods may tile the clipped images or, in other words, size the image based on selected sizes utilized by the trained machine learning model or to a predefined or preselected size. In an embodiment, the steps of georeferencing, determining areas of interest, clipping, and/or tiling may be considered pre-processing. Pre-processing the images, prior to application to the trained machine learning model, may include other steps or sub-processes.

Once an image has been pre-processed, the systems and methods may apply the image to the trained machine learning model. Such application may determine whether the vegetation captured in the image is encroaching upon the right-of-way. Further, the such an application may produce or provide a probability associated with vegetation encroachment, a risk of vegetation encroachment, images highlighting the vegetation encroachment, images indicating the location of vegetation encroachment, and/or highlighting a portion of the image to indicate vegetation to be managed. In another embodiment, if the systems and methods determine that the vegetation is encroaching upon a right-of-way or that vegetation encroachment exceeds a selected threshold, then the systems and methods may generate an alert indicating the severity of such vegetation encroachment and/or remedial actions. The alert may include, in an example, a prediction indicating when remedial action and/or further inspection may be performed.

Thus, such systems and methods may quickly determine whether vegetation is encroaching upon a right-of-way using less resources and/or direct technicians to such a location to manage the vegetation to prevent further issues and allow for continued monitoring of the right-of-way. Such systems and methods may provide targeted vegetation management, rather than sending technicians to portions of a right-of-way based on time rather than based on a determination that a portion of the right-of-way includes vegetation encroachment.

FIG. 1A is a simplified diagram that illustrates a system for determining vegetation encroachment along a right-of-way, according to an embodiment of the disclosure. The vegetation encroachment system 102 may include a processor 104 and memory 106. The memory 106 may store instructions, such as image capture instructions 108, model training instructions 110, and/or vegetation encroachment modeling instructions 112. The vegetation encroachment system 102 may connect to a vehicle 114 or a sensor 116 (such as an image sensor) of the vehicle 114. In an embodiment, the vegetation encroachment system 102 may be in signal communication with the vehicle 114 or sensor 116. In such an embodiment, the vegetation encroachment system 102 may receive images as they are captured by the vehicle 114 or sensor 116. In another embodiment, the vegetation encroachment system 102 may receive captured images after the images are captured and after the vehicle 114 has returned to a selected location. In yet another embodiment, the vegetation encroachment system 102 may connect to a database 118. In such an embodiment, the captured images may be transferred to the database 118 from the vehicle 114 and the vegetation encroachment system 102 may obtain images from the database 118. Further, the vegetation encroachment system 102 may connect to a user interface 120 and/or a controller 122. The vegetation encroachment system 102 may request and/or receive images from the user interface 120 and/or controller 122. Further, the vegetation encroachment system 102 may generate alerts and transmit such alerts to a user via the user interface 120 and/or the controller 122.

As noted, the memory 106 may include instructions. The instructions may include image capture instructions 108. When the image capture instructions 108 are executed by the processor, the image capture instructions 108 may initially cause the vegetation encroachment system 102 to receive, request capture, and/or initiate capture of images over a right-of-way. Such an initiation or request may occur at selected time periods for different rights-of-way. For example, for rights-of-way with little to no vegetation, image capture may occur less frequently, while, for areas with large amounts of vegetation, image capture may occur more frequently. In an embodiment, the vehicle 114 may include a drone. In such examples, the vegetation encroachment system 102 may automatically cause the vehicle 114 to capture the images. In another embodiment, as noted above, the vegetation encroachment system 102 may capture or receive images from a database 118, via a user interface 120, from a controller 122, and/or via another computing device. In an embodiment, each image may include one or more of latitude, longitude, elevation, XY coordinates, Z coordinates, or measurements.

The memory 106 may also include model training instructions 110. The model training instructions 110 may be executed if no current trained machine learning model is available and/or if a current trained machine learning model is to be retrained (for example, if the trained machine learning model accuracy falls below a selected threshold and/or if the output of an available trained machine learning model is evaluated and/or marked up and transmitted to the vegetation encroachment system 102). Execution of the model training instructions 110 may cause the instructions to execute the image capture instructions 108 to obtain or receive historical images and/or other images. Once the historical images have been obtained, the model training instructions 110 may classify the historical images. In an embodiment, the vegetation encroachment system 102 may mark up or classify the historical images. In another embodiment, the vegetation encroachment system 102 and/or a user may mark up or classify the historical images or portions of the historical images. In such embodiments, the vegetation encroachment system 102 and/or the user may mark, label, or highlight the vegetation and/or the right-of-way in the images. Once the marked up or classified images are available, the model training instructions 110 may use the images to train, refine, tune, and/or retrain a machine learning model. In other words, the marked up images may be applied to a machine learning algorithm, such an application causing the machine learning algorithm to determine and recognize patterns and/or interpret data in the marked up or classified images to produce or provide a trained machine learning model (to which unmarked images may be applied to, to produce or provide a probability or likelihood that an image indicates vegetation encroachment). In an embodiment, the vegetation encroachment system 102 may utilize a first subset of the historical images to train the trained machine learning model. The vegetation encroachment system 102 may utilize the remaining images or a second subset of historical images to test subsequently trained machine learning models and to produce or provide a model accuracy value. The second subset of images may include unmarked or unclassified historical images and corresponding marked or classified historical images. The vegetation encroachment system 102 may apply the unmarked or unclassified historical images of the second subset to the trained machine learning model to produce or provide an output (for example, a probability, a risk, and/or an image highlighting vegetation encroachment). The vegetation encroachment system 102 may then compare the output to the marked up or classified second subset of images to produce or provide the model accuracy value. If the vegetation encroachment system 102 determines that the model accuracy value is below a selected threshold (for example, about 90% or about 95%), the vegetation encroachment system 102 may randomize the historical images and/or obtain new images to retrain the trained machine learning model.

Machine learning algorithms or models may include a semantic segmentation algorithm, decision trees, random forest models, random forests utilizing bagging or boosting (as in, gradient boosting), neural network methods, support vector machines (SVM), Generative Adversarial Networks (GANs) and/or its variations, and other supervised learning models, other semi-supervised learning models, other unsupervised learning models, or some combination thereof, as will be readily understood by one having ordinary skill in the art. In a non-limiting example, a trained machine learning model utilizing a semantic segmentation algorithm may classify, categorize, or label each pixel from each image input into the trained machine learning model. The trained machine learning model (and/or other circuitry and/or algorithms) may then determine vegetation migration encroachment based on the classification, categorization, or label of each pixel for each image.

In an embodiment, the input to the trained machine learning model or classifier includes each captured image and an output of the trained machine learning model includes one or more of a probability indicating a risk of vegetation encroachment (for example, the probability to indicate various next actions, such as indicating a new time to capture additional images and/or indicating cutting, removing, reducing, and/or adjusting current vegetation) and/or a new image highlighting vegetation encroachment.

As noted, the trained machine learning model may be refined or retrained based on evaluated images. For example, an output of the trained machine learning model may be analyzed by a technician at selected time periods. Based on such an analysis, the output, which may or may not include additional mark ups from the technician, may be utilized, along with the corresponding captured image, to refine or retrain the trained machine learning model.

The memory 106 may also include vegetation encroachment modeling instructions 112. The vegetation encroachment modeling instructions 112 may be executed when or if a trained machine learning model is available. The vegetation encroachment modeling instructions 112 may, prior to applying a captured image to a trained machine learning model, preprocess captured images. Preprocessing may include georeferencing a captured image, determining an area of interest of the captured image, clipping the area of interest from the image, and tiling the clipped image.

In an embodiment, georeferencing a captured image may include assigning coordinates to the image based on spatial references and/or other data (such as location data and/or known references in the image). The vegetation encroachment system 102 may utilize georeferencing to ensure that the captured image relates to a right-of-way and/or to use fewer captured images for various sections of the right-of-way.

In another embodiment, determining an area of interest may be based on known relevant sections of images, based on, for example, the location of the right-of-way and/or the location of a right-of-way buffer (as determined via georeferencing). The right-of-way buffer may indicate a section of the right-of-way meant to be clear from vegetation. Further, the right-of-way buffer may comprise a range of about 20 feet and/or up to about 50 feet from a center line of the right-of-way. Thus, the vegetation encroachment system 102 may determine areas pertinent to vegetation management. After determining the area of interest, the vegetation encroachment system 102 may clip the captured image to remove the other areas not included in the areas of interest. The vegetation encroachment system 102 may then tile the clipped image. In other words, the vegetation encroachment system 102 may re-size the clipped image to a size that the trained machine learning model is configured to use and/or to a predefined or preselected size. Such a size may include about 640 by about 640 pixels, about 960 by about 960 pixels, or a smaller or larger size.

After the pre-processing steps described above, the vegetation encroachment modeling instructions 112 may apply the clipped image to the trained machine learning model. Such an application to the trained machine learning model may produce or provide, as noted, a probability of risk of vegetation encroachment and/or marked up images highlighting vegetation encroachment and/or potential areas of vegetation encroachment. The vegetation encroachment modeling instructions 112 may determine whether any vegetation encroachment exceeds a selected threshold (for example, a distance of encroachment in relation to the center of the right-of-way or pipeline) and, if the vegetation encroachment does exceed the selected threshold, generate an indication (for example, an alert) of vegetation encroachment. Such an indication may include the location and/or coordinates of the vegetation encroachment, the type of vegetation, and/or remedial actions (for example, removing, cutting, trimming, and/or adjusting vegetation and/or monitoring the right-of-way at an adjusted selected time period). Further, in another embodiment, the vegetation encroachment system 102 may execute or perform the remedial action.

In an embodiment, the vegetation encroachment system 102 may recognize or determine where a pipeline or other underground feature is positioned or located via the vegetation encroachment modeling instructions. Once the location of the pipeline or other underground feature is located, the vegetation encroachment system 102 may determine the right-of-way buffer based on that location. The vegetation encroachment system 102 may determine the position of the pipeline or other underground feature based on, for example, markers or features (for example, pipeline markers, aerial markers, and/or natural and/or man-made features along the right of way) along a right-of-way and/or previously existing location data (for example, from geographic information system (GIS) data for a particular location) and the georeferenced image. In such embodiments, the vegetation encroachment system 102 may overlay the pipeline or other underground feature location on the marked images, thus illustrating where the pipeline or other underground feature is in relation to vegetation encroachment. In an embodiment, the spatial accuracy of the pipeline or underground feature location may be within about 10 feet. In another embodiment, the georeferenced image may be accurate within about 95% or even greater of the actual landscape of the pipeline right-of-way, based on known landmarks and high-resolution image sensors positioned on the vehicle 114. In an embodiment, the underground feature may include one of pipeline, utility lines, sewage or septic lines or tanks, or tunnels.

In an embodiment, the pipeline may transport one or more fluids. In a further embodiment, the pipeline may transport hydrocarbons and/or renewable hydrocarbons, as well as water and/or other fluids.

In an embodiment, the vegetation encroachment system 102 may allow for monitoring of a reduced right-of-way buffer due to the fact that vegetation encroachment is proactively and accurately recognized and/or predicted. Thus, a smaller right-of-way buffer may be utilized and/or vegetation encroachment remediation may be performed at longer time frames than typical for simple visual inspection.

As noted, the vegetation encroachment system 102 may connect to a controller 122 or a plurality of controllers. In such embodiments, the controller 122 may be utilized to monitor the right-of-way. The controller 122 may control various vehicles and/or other components associated with underground features (such as a pipeline).

In some examples, the vegetation encroachment system 102 may be a computing device. The term "computing device" is used herein to refer to any one or all of programmable logic controllers (PLCs), programmable automation controllers (PACs), industrial computers, servers, virtual computing device or environment, desktop computers, personal data assistants (PDAs), laptop computers, tablet computers, smart books, palm-top computers, personal computers, smartphones, virtual computing devices, cloud based computing devices, and similar electronic devices equipped with at least a processor and any other physical components necessarily to perform the various operations described herein. Devices such as smartphones, laptop computers, and tablet computers are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

As used herein, a "non-transitory machine-readable storage medium," "non-transitory computer-readable storage medium," or "memory" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

As used herein, a "processor" or "processing circuitry" may include, for example one processor or multiple processors included in a single device or distributed across multiple computing devices. The processor (such as, processor 104 shown in FIG. 1A or processing circuitry 202 shown in FIG. 2) may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

Figure 1B:
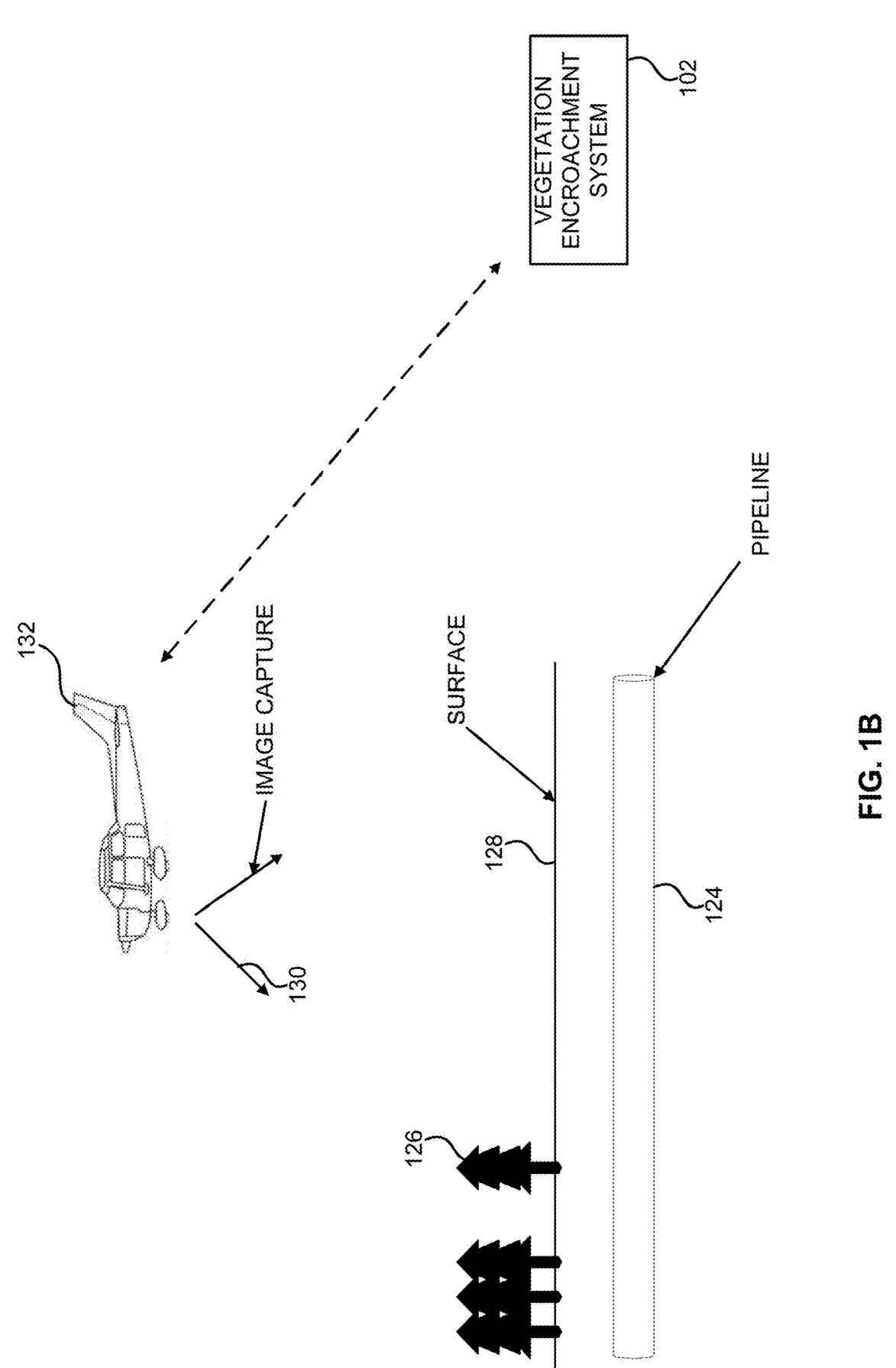
FIG. 1B and FIG. 1C are simplified schematic diagrams that illustrate a system for determining vegetation encroachment along a right-of-way and a vehicle for capturing images of the right-of-way, according to an embodiment of the disclosure.
Figure 1C:
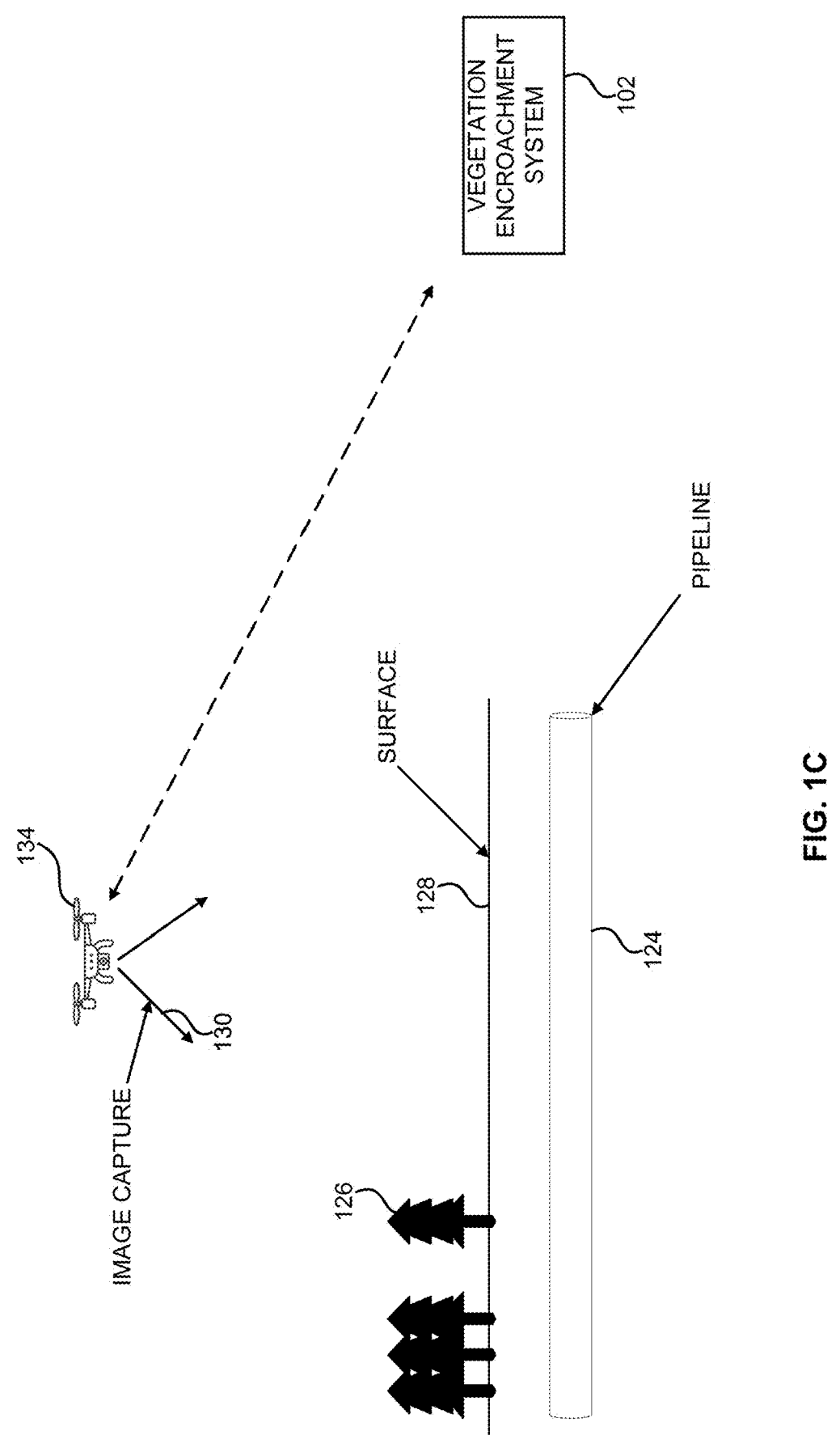

FIG. 1B and FIG. 1C are simplified schematic diagrams that illustrate a system for determining vegetation encroachment along a right-of-way and a vehicle for capturing images of the right-of-way, according to an embodiment of the disclosure. Turning first to FIG. 1B, the underground feature comprises a pipeline 124 buried underground or positioned beneath the surface 128. While a pipeline 124 is illustrated, as a non-limiting embodiment, as the underground feature, it will be understood that other underground features may be positioned underground along a right-of-way. While the surface 128 is illustrated as a flat surface, it will be understood that the surface may comprise a flat or relatively uniform surface, an uneven surface, a surface including various objects (for examples, trees, other foliage, buildings, water-ways, and/or other objects), a sloping surface, and/or combinations thereof along the entirety of a right-of-way. As illustrated, the right-of-way may include vegetation 126. While the vegetation 126 illustrated includes trees, it will be understood that other types of vegetation may grow along the right of way, including grass, trees, shrubs, and/or other types of vegetation. Further, the vegetation migration and/or encroachment may include one or more types. For example, the vegetation migration and/or encroachment types may include grass or other vegetation of a selected height growing on the surface of the right-of-way, the canopy of vegetation growing over the right-of-way (also referred to as canopy overgrowth), and/or overgrowth of other vegetation.

The vehicle, in such embodiments, may comprise a manned aerial vehicle 132, such as an airplane. The manned aerial vehicle 132 may include an image sensor (for example, a camera, a series of image sensors, a normal camera, a high-resolution camera, a wide-angle camera, an ultra-wide angle camera, an infrared camera, a video camera, a camera configured to take a plurality of images consecutively and at high speed, and/or a camera configured to capture multi-spectral images, among other types of cameras) configured to capture images (as illustrated by 130 in FIG. 1B), such as single images, high-resolution images, a series of images, infrared images, multi-spectral images, video, a series of images, and/or other types of images as will be understood by one skilled in the art. The manned aerial vehicle 132 may fly along a portion of or the entirety of the right-of-way, capturing images along the route. The manned aerial vehicle 132 may connect to the vegetation encroachment system 102. In an embodiment, as the manned aerial vehicle 132 captures images, the manned aerial vehicle may transmit those images to the depth of vegetation encroachment system 102 in real time. In another embodiment, the manned aerial vehicle 132 may capture the images and, once the flight along the right-of-way is complete, return to a location. At the location, the manned aerial vehicle 132 may connect to the vegetation encroachment system 102, a database, and/or another computing device. The manned aerial vehicle 132 may then proceed to transmit the images to the vegetation encroachment system 102, a database, and/or another computing device. In embodiments, the vegetation encroachment system 102 may connect to the database and/or the another computing device and, if the manned aerial vehicle 132 transmits images to the database and/or the another computing device, receive and/or scan for images collected and stored in the database and/or the another computing device.

Turning to FIG. 1C, other vehicles may be used to capture images, rather than or in addition to the manned aerial vehicle 132. For example, an unmanned aerial vehicle 134 (such as a drone) and/or, in other embodiments, a transportation vehicle (such as a truck or all-terrain vehicle) may be utilized to capture images. Other vehicles may be utilized, as well as satellite based imagery.

In an embodiment, each captured image may include a time stamp and/or location data. If multiple vehicles and/or other image sources (for example, satellites) are used to capture images, then the vegetation encroachment system 102 may utilize the location data for georeferencing.

Figure 2:
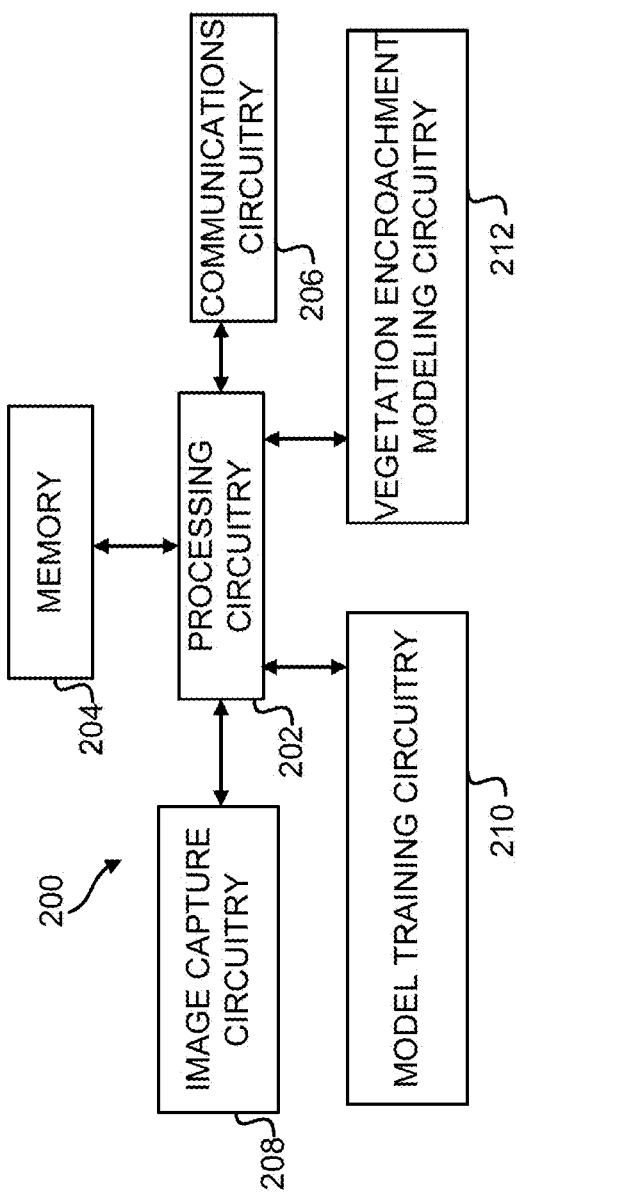
FIG. 2 is a simplified diagram that illustrates an apparatus for determining vegetation encroachment along a right-of-way, according to an embodiment of the disclosure.

FIG. 2 is a simplified diagram that illustrates an apparatus for determining vegetation encroachment along a right-of-way, according to an embodiment of the disclosure. Such an apparatus 200 may be comprised of a processing circuitry 202, a memory 204, a communications circuitry 206, an image capture circuitry 208, model training circuitry 210, and a vegetation encroachment modeling circuitry 212, each of which will be described in greater detail below. While the various components are illustrated in FIG. 2 as being connected with processing circuitry 202, it will be understood that the apparatus 200 may further comprise a bus (not expressly shown in FIG. 2) for passing information amongst any combination of the various components of the apparatus 200. The apparatus 200 may be configured to execute various operations described herein, such as those described above in connection with FIGS. 1A-1C and below in connection with FIGS. 3-4B.

The processing circuitry 202 (and/or co-processor or any other processor assisting or otherwise associated with the processor) may be in communication with the memory 204 via a bus for passing information amongst components of the apparatus. The processing circuitry 202 may be embodied in a number of different ways and may, for example, include one or more processing devices configured to perform independently. Furthermore, the processor may include one or more processors configured in tandem via a bus to enable independent execution of software instructions, pipelining, and/or multithreading.

The processing circuitry 202 may be configured to execute software instructions stored in the memory 204 or otherwise accessible to the processing circuitry 202 (for example, software instructions stored on a separate storage device). In some cases, the processing circuitry 202 may be configured to execute hard-coded functionality. As such, whether configured by hardware or software methods, or by a combination of hardware with software, the processing circuitry 202 represents an entity (for example, physically embodied in circuitry) capable of performing operations according to various embodiments of the present disclosure while configured accordingly. Alternatively, as another example, when the processing circuitry 202 is embodied as an executor of software instructions, the software instructions may specifically configure the processing circuitry 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus 200 to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network. The communications circuitry 206, in an embodiment, may enable reception of images captured by a vehicle and/or enable transmission of a marked up or overlayed image.

The apparatus 200 may include image capture circuitry 208 configured to initiate capture of images. Initiating capture of images may include prompting a user or technician to begin a fly over of a selected right-of-way and/or automatically initiating an unmanned vehicle (such as an unmanned aerial vehicle) to begin traversing (such as via flying over) a right-of-way. The image capture circuitry 208 may utilize processing circuitry 202, memory 204, or any other hardware component included in the apparatus 200 to perform these operations, as described in connection with FIGS. 4A-4B below. The image capture circuitry 208 may further utilize communications circuitry 206, as noted above, to gather data (such as images) from a variety of sources (for example, from a database, the memory 204, via a user interface, from a vehicle, and/or from another source). The output of the image capture circuitry 208 may be transmitted to other circuitry of the apparatus 200 (such as the model training circuitry 210 and/or the vegetation encroachment modeling circuitry 212).

In addition, the apparatus 200 further comprises the model training circuitry 210 that may train a machine learning model to recognize and/or determine whether vegetation encroachment exceeds a threshold and/or to output an image highlighting or identifying vegetation encroachment. The model training circuitry 210 may receive historical images (including marked and/or classified images), utilize a subset of those images to train the machine learning model, and utilize the remaining images to test the trained machine learning model. The model training circuitry 210 may utilize processing circuitry 202, memory 204, or any other hardware component included in the apparatus 200 to perform these operations, as described in connection with FIGS. 4A-4B below. The model training circuitry 210 may further utilize communications circuitry 206 to gather data (for example, images) from a variety of sources (such as the image capture circuitry 208) and, in some embodiments, output a trained machine learning model. In such examples, the output of the model training circuitry 210 may be utilized by and/or transmitted to the vegetation encroachment modeling circuitry 212.

The apparatus 200 further comprises the vegetation encroachment modeling circuitry 212 that may receive images of a right-of-way, georeference the images, determine an area of interest in the images, clip the area of interest, tile the clipped images, apply the tiled images to the trained machine learning model, determine whether vegetation encroachment exceeds a threshold, and generate an indication and/or alert if the vegetation encroachment exceeds the threshold. The vegetation encroachment modeling circuitry 212 may utilize processing circuitry 202, memory 204, or any other hardware component included in the apparatus 200 to perform these operations, as described in connection with FIGS. 4A-4B below. The vegetation encroachment modeling circuitry 212 may further utilize communications circuitry 206 to transmit an alert to a user, controller, and/or computing device.

Although components 202-212 are described in part using functional language, it will be understood that the particular implementations necessarily include the use of particular hardware. It should also be understood that certain of these components 202-212 may include similar or common hardware. For example, the image capture circuitry 208, the model training circuitry 210, and the vegetation encroachment modeling circuitry 212 may, in some embodiments, each at times utilize the processing circuitry 202, memory 204, or communications circuitry 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the image capture circuitry 208, the model training circuitry 210, and the vegetation encroachment modeling circuitry 212 may leverage processing circuitry 202, memory 204, or communications circuitry 206 as described above, it will be understood that any of these elements of apparatus 200 may include one or more dedicated processors, specially configured field programmable gate arrays (FPGA), or application specific interface circuits (ASIC) to perform its corresponding functions, and may accordingly leverage processing circuitry 202 executing software stored in a memory or memory 204, communications circuitry 206 for enabling any functions not performed by special-purpose hardware elements. In all embodiments, however, it will be understood that the survey and image capture circuitry 208, the model training circuitry 210, and the vegetation encroachment modeling circuitry 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200 (or by a controller 302). Furthermore, some example embodiments (such as the embodiments described for FIGS. 1A and 3) may take the form of a computer program product comprising software instructions stored on at least one non-transitory computer-readable storage medium (such as memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces or provides a special-purpose machine comprising the means for implementing various functions described herein.

Figure 3:
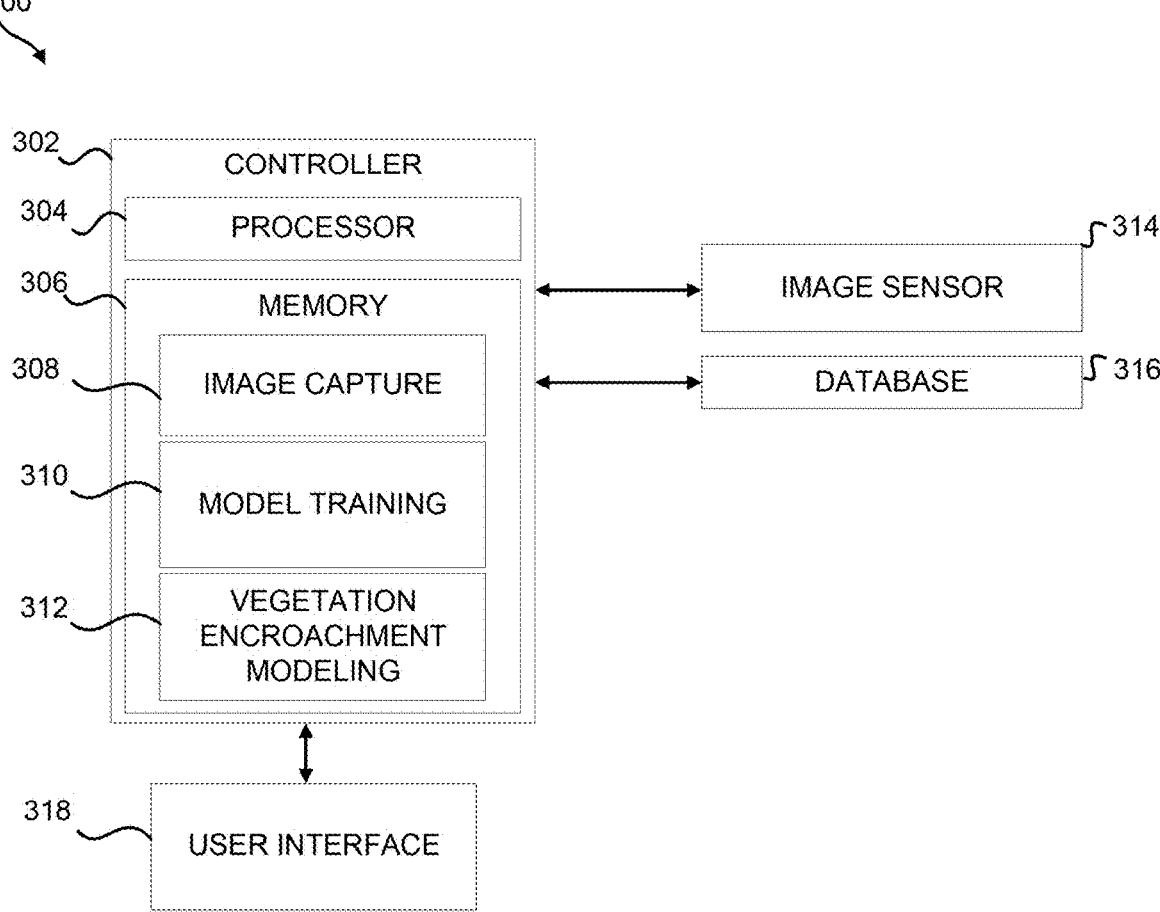
FIG. 3 is a simplified diagram that illustrates a control system for controlling determination of vegetation encroachment along a right-of-way, according to an embodiment of the disclosure.

FIG. 3 is a simplified diagram that illustrates a control system 300 for controlling determination of vegetation encroachment along a right-of-way, according to an embodiment of the disclosure. Further, controller 302 may connect to the an image sensor 314, a vehicle, a database 316, and/or other electronic devices positioned at various locations. The controller 302 may include memory 306 and one or more processors 304. The memory 306 may store instructions executable by one or more processors 304. In controller an example, the memory 306 may be a non-transitory machine-readable storage medium. The memory 306 may store or include instructions executable by the processor 304. As used herein, "signal communication" refers to electric communication such as hardwiring two components together or wireless communication, as understood by those skilled in the art. For example, wireless communication may be Wi-Fi®, Bluetooth®, ZigBee, or forms of near-field communications. In addition, signal communication may include one or more intermediate controllers or relays disposed between elements in signal communication.

As note, the memory 306 may store instructions, such as image capture instructions 308. The image capture instructions when executed may prompt, cause, or initiate a vehicle to capture images of a selected right-of-way. The memory 306 may include model training instructions 310. The model training instructions 310 may, when executed by the processor 304, gather or receive captured images. The model training instructions 310, when executed by the processor 304, may classify the captured images. In another embodiment, the captured images may be classified prior to reception by the controller 302. The model training instructions 310, when executed by the processor 304, may apply the classified and captured images to a machine learning algorithm to generate a trained machine learning model or classifier. The instructions when executed may also test the trained machine learning model or classifier to ensure that the trained machine learning model or classifier meets or exceeds a selected model accuracy.

The memory 306 may include vegetation encroachment modeling instructions 312. The vegetation encroachment modeling instructions 312 may, when executed by the processor 304, georeference captured images, determine an area of interest in the georeferenced images, clip the area of interest from the georeferenced images, and/or tile the clipped image. The vegetation encroachment modeling instructions 312 may apply the images to the trained machine learning model or classifier to produce or provide a probability of risk of vegetation encroachment and/or a marked up image illustrating vegetation encroachment.

Figure 4A:
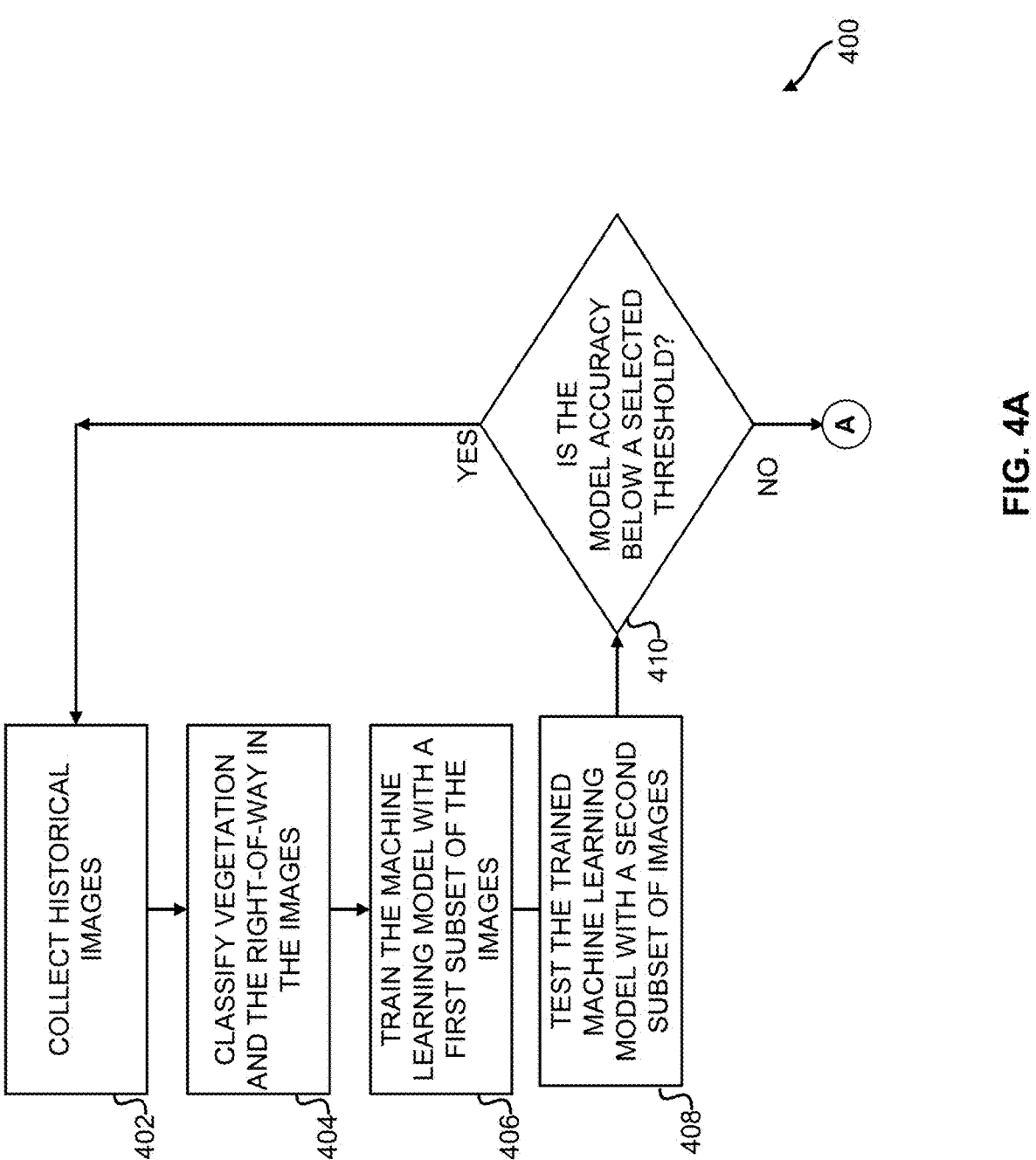
FIG. 4A and FIG. 4B are simplified flow diagrams for determining vegetation encroachment along a right-of-way, according to an embodiment of the disclosure.
Figure 4B:
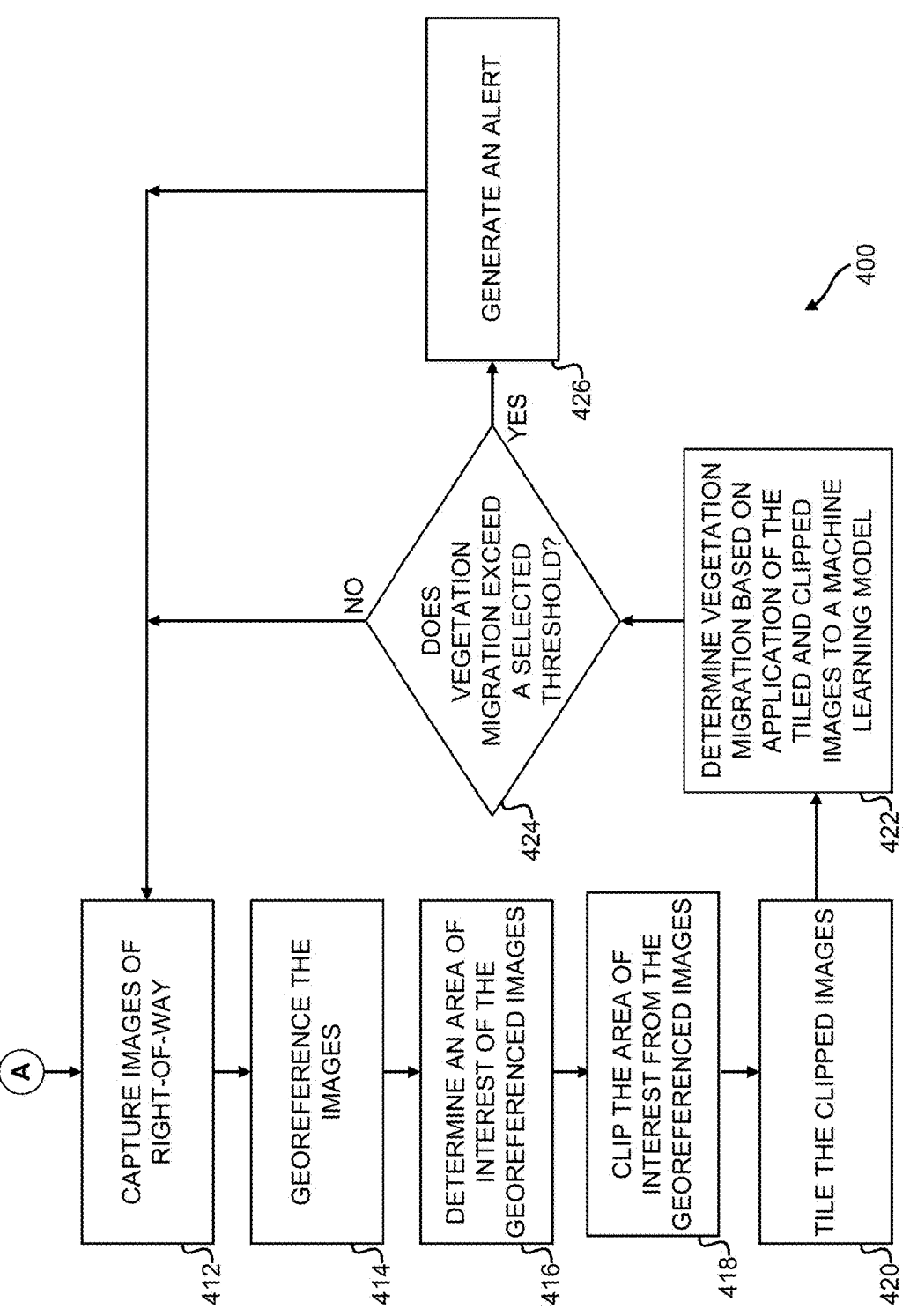
Figure 5A:
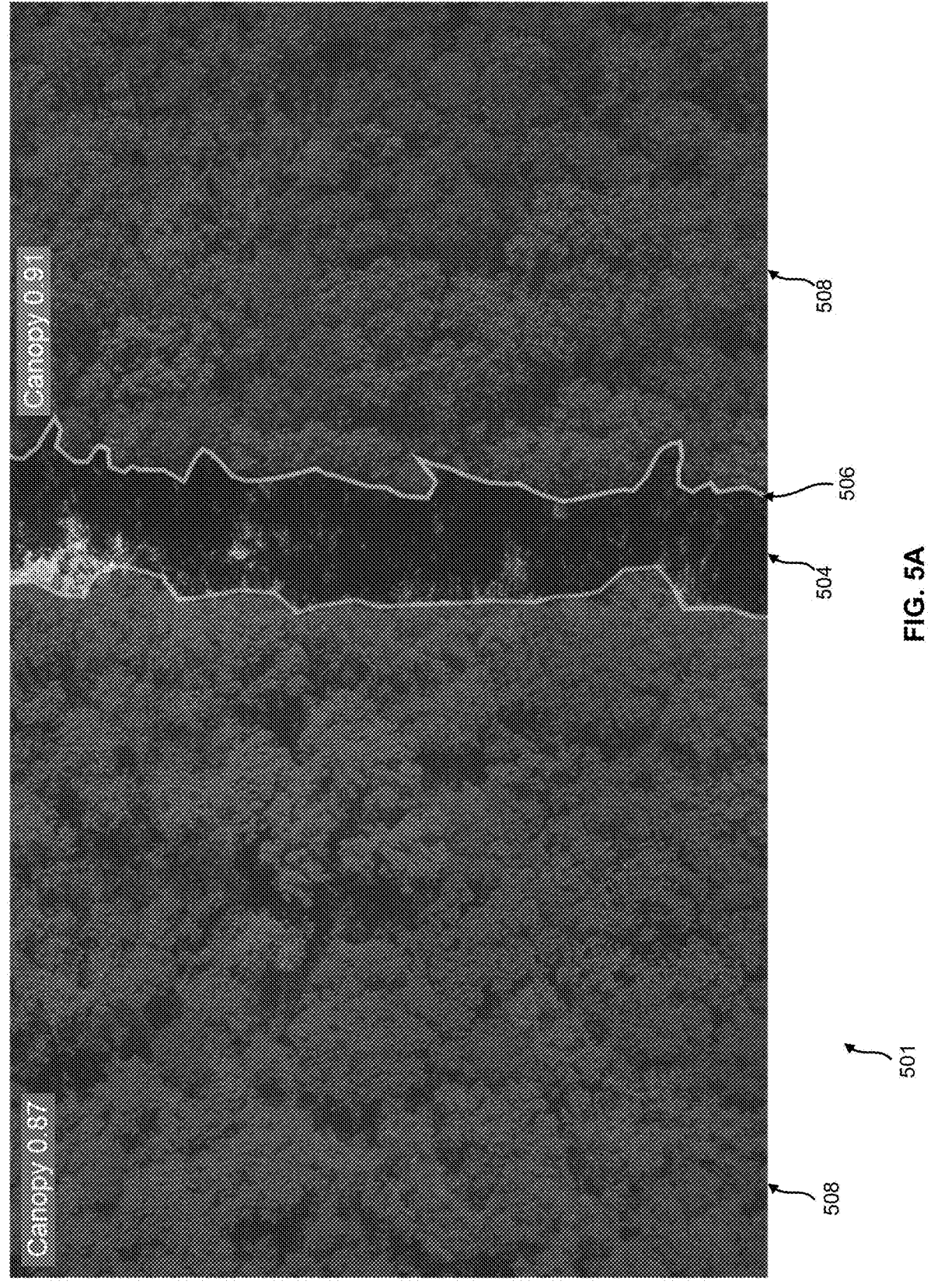
FIG. 5A, FIG. 5B, FIG. 5C, and FIG. 5D are examples of images captured by a vehicle and analyzed via systems and methods described herein, according to an embodiment of the disclosure.
Figure 5B:
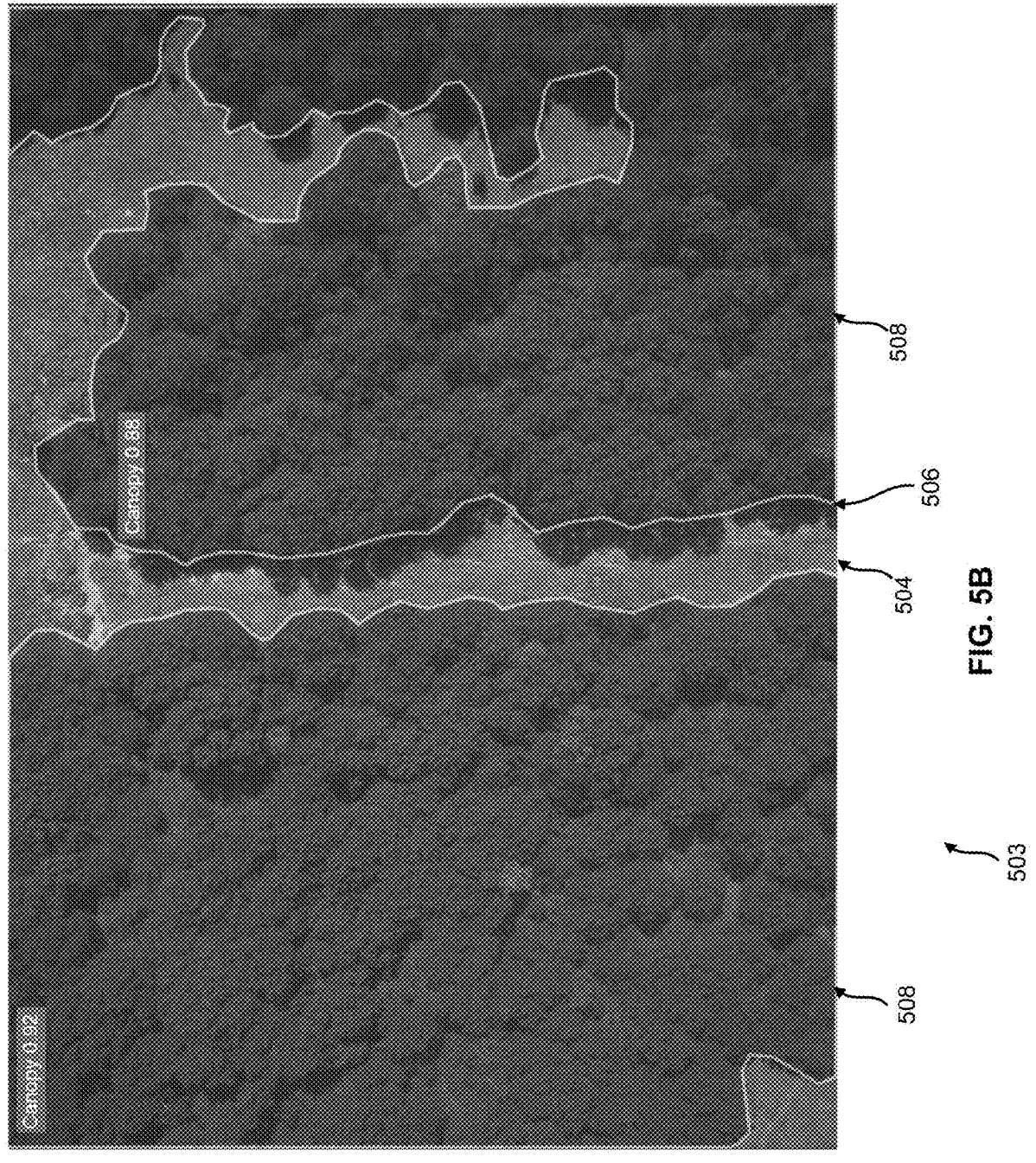
Figure 5C:
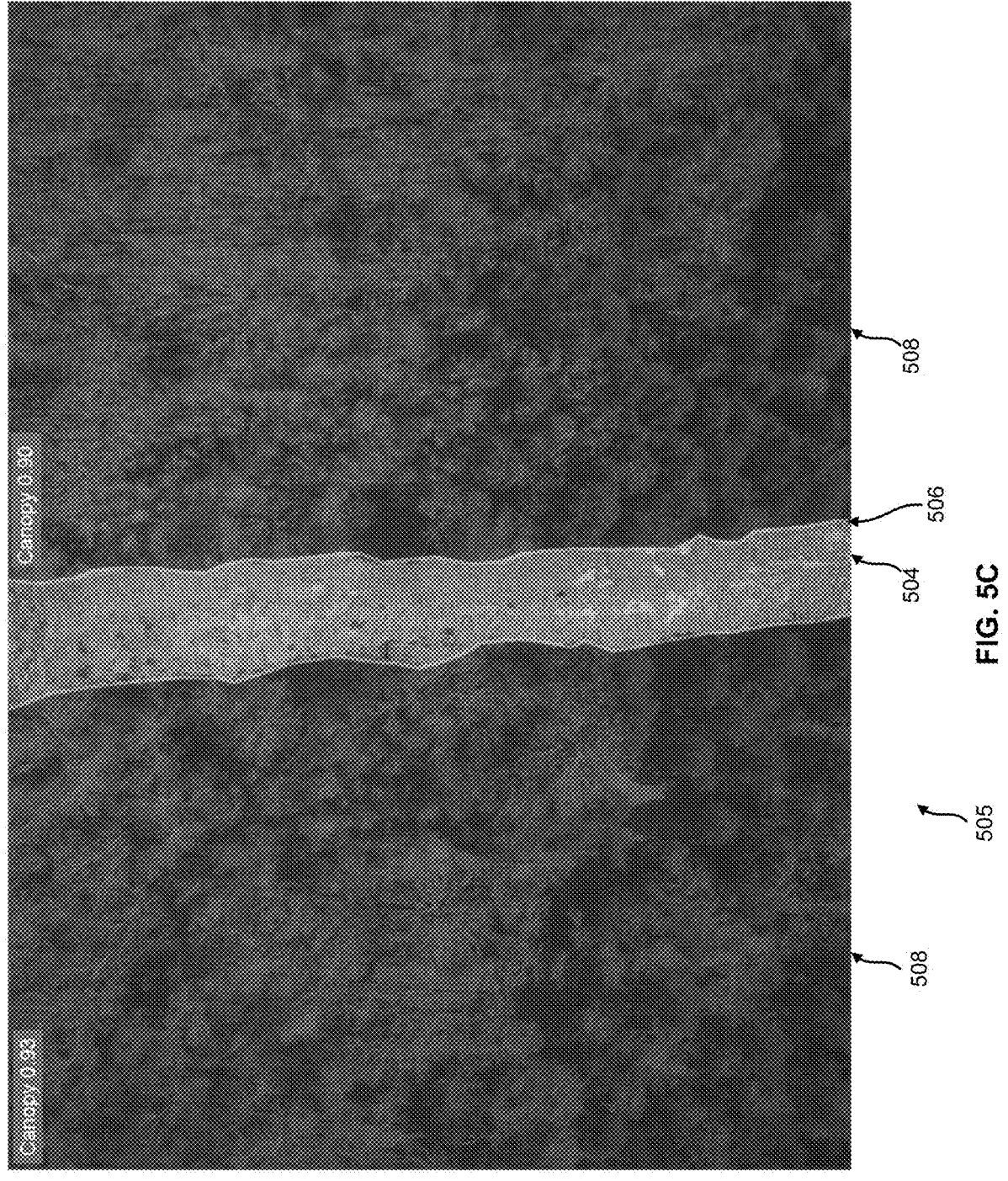
Figure 5D:
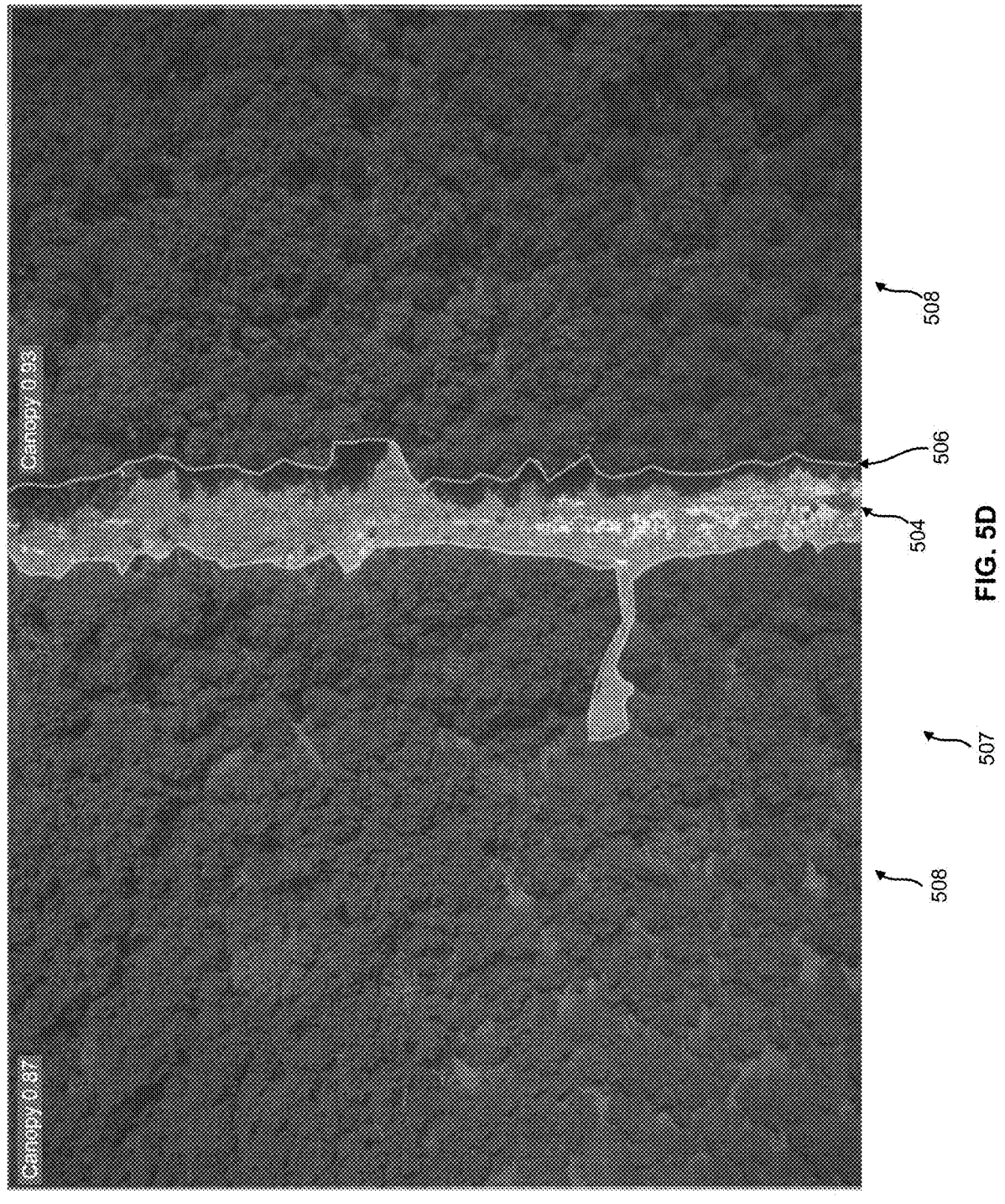

FIGS. 4A-4B is a simplified flow diagram for determining vegetation encroachment along a right-of-way, according to an embodiment of the disclosure. Unless otherwise specified, the actions of method 400 may be completed within controller 302. Specifically, method 400 may be included in one or more programs, protocols, or instructions loaded into the memory of controller 302 and executed on the processor or one or more processors of the controller 302. In other embodiments, method 400 may be implemented in or included in components of FIGS. 1A-3. The order in which the operations are described is not intended to be construed as a limitation, and any number of the described blocks may be combined in any order and/or in parallel to implement the methods.

Blocks 402 through 410 illustrate an embodiment of training a machine learning model or classifier. At block 402, the controller 302 may collect historical images. The controller 302 may receive or collect the historical images from a database, a computing device, another storage device, and/or directly from a vehicle. The historical images may include images captured at various times. In an embodiment, the historical images may include recently captured images of a right-of-way.

At block 404, the controller 302 may classify the vegetation and the right-of-way in the images. In embodiments, the controller 302 may classify other objects in the images. In another embodiment, a user may perform such classifications. In yet another embodiment, the historical images may include the classifications. In other words, the controller 302 may receive marked up and/or classified historical images.

At block 406, the controller 302 may train a machine learning model or classifier by applying a first subset of the classified and/or marked up historical images to a machine learning algorithm. At block 408, the controller 302 may test the trained machine learning model with a second subset of unmarked and/or unclassified historical images. Once the second subset of unmarked and/or unclassified historical images is applied to the trained machine learning model, the trained machine learning model may produce or provide an output (for example, a probability of risk of vegetation encroachment and/or a classified and/or marked up image). The controller 302 may compare the output to a corresponding marked up and/or classified image from the second subset of historical images. Such a comparison may produce or provide a model accuracy. At block 410, if the model accuracy is below a selected threshold, the controller 302 may obtain more images and/or utilize another subset of the existing historical images to retrain or further refine the trained machine learning model to increase model accuracy.

Blocks 412 through 426 describe an embodiment of detecting vegetation encroachment. At block 412, the controller 302 may prompt or initiate capture of images of the right-of-way. For example, the controller 302 may prompt a user to begin capturing images along a right of way in a vehicle. In another example, the controller 302 may initiate capture of images via an unmanned vehicle. At block 414, the controller 302 may georeference the captured images. At block 416, the controller 302 may determine an area of interest of the georeferenced images. At block 418, the controller 302 may clip the area of interest from the georeferenced images. At block 420, the controller 302 may tile the clipped images. At block 422, the controller 302 may determine vegetation migration and/or encroachment based on application of the tiled and clipped images to the trained machine learning model or classifier. The vegetation migration and/or encroachment may be represented by one or more of a probability or a marked up image. In an embodiment, the marked up image may include classifications, labels, or categories for each pixel in the marked up image. Such classifications, labels, or categories may correspond to a type of vegetation migration and/or encroachment (for example, no vegetation migration and/or encroachment, an amount of vegetation migration and/or encroachment indicating remedial action at a later time frame, and/or an amount of vegetation migration and/or encroachment indicating immediate remedial action). At block 424, the controller 302 may determine whether the vegetation migration and/or encroachment exceeds a selected threshold. For example, the controller 302 may utilize the classification, labels, or categorization of each pixel to determine if the selected threshold has been exceeded. In such examples, the controller 302 may determine whether an amount of pixels with a selected label at or proximate the right-of-way buffer exceed a pre-selected amount. If the selected threshold is exceeded, then the controller 302 may generate an alert. Otherwise, the controller 302 may begin the process again, at block 412, after a selected time period. In a further embodiment, the trained machine learning model or classifier or another trained machine learning model may generate a prediction. The prediction may indicate when a right-of-way may experience vegetation migration and/or encroachment, when further inspection may be performed, and/or when remedial action may be taken. In another embodiment, the controller 302 may perform or execute a remedial action included in the alert.

In another embodiment, the controller 302 may output a marked up or overlayed image of the right-of-way. Further, the controller 302 may receive a validated or updated or further marked up image. In response to reception of validated or updated or further marked up image, the controller 302 may further refine and/or retrain the trained machine learning model using the validated or updated or further marked up image.

FIG. 5A, FIG. 5B, FIG. 5C, and FIG. 5D are examples of images captured by a vehicle and analyzed via systems and methods described herein, according to an embodiment of the disclosure. FIGS. 5A through 5D illustrate captured images (for example, images 501, 503, 505, and 507) marked up and/or classified to differentiate the canopy 508 from the right of way 504. Those images may be marked up and/or classified according to the methods described herein. For example, a vehicle may capture an image. A controller (for example, controller 302) or computing device (for example, the vegetation encroachment system 102) may cause the vehicle to capture such images. The controller or computing device may then georeference the image to correlate the image with a selected surface of a geographical location. In other words, the controller or computing device may assign coordinates to the image based on spatial references and/or other data (such as location data and/or known references in the image). Using the georeferenced image, the controller or computing device may determine an area of interest, clip the area of interest, and clip the tiled image. The controller or computing device may then apply the tiled image to a trained machine learning model to produce a marked up and/or classified image. As noted, the canopy 508 may be differentiated from the right of way 504, such as via different colors and/or pattern. Further, the right of way may be outlined (see lines 506) and potential canopy encroachment may be determined therefrom. In an embodiment, such images may include a probability indicating potential vegetation encroachment and the type of vegetation encroachment, as well as remedial actions. In another embodiment, potential vegetation encroachment may be further differentiated via color and/or pattern. As the images are marked up and/or classified, as described above, the controller or computing device may also generate the probability, via application of the tiled images to the trained machine learning model. In another embodiment, the controller or computing device may overlay probabilities exceeding a selected threshold at corresponding areas of the right of way onto the images.

The present application claims priority to and the benefit of U.S. Provisional Application No. 63/540,822, filed Sep. 27, 2023, titled "SYSTEMS AND METHODS TO DETERMINE DEPTH OF SOIL COVERAGE ALONG A RIGHT-OF-WAY," U.S. Provisional Application No. 63/540,692, filed Sep. 27, 2023, titled "SYSTEMS AND METHODS TO DETERMINE VEGETATION ENCROACHMENT ALONG A RIGHT-OF-WAY," and U.S. Provisional Application No. 63/539,039, filed Sep. 18, 2023, titled "SYSTEMS AND METHODS TO DETERMINE DEPTH OF SOIL COVERAGE ALONG A RIGHT-OF-WAY," the disclosures of which are incorporated herein by reference in their entirety.

Although specific terms are employed herein, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A method to determine vegetation migration encroachment along a pipeline right-of-way, the method comprising:

capturing images of one or more sections of the pipeline right-of-way during a selected time period;

georeferencing the images to correlate the images with a surface of a geographical location of the pipeline right-of-way;

determining an area of interest for the images based on one or more of the geographical location of the pipeline right-of-way or previously known areas of interest;

clipping the area of interest from an image to define a clipped image based on a pipeline right-of-way buffer, wherein the clipped image does not include a portion of the image that includes one or more of an area that is not near the right-of-way or an area of the right-of-way that could not be affected by vegetation encroachment;

tiling clipped images to a preselected size to define a plurality of tiled clipped images based on selected sizes utilized by a trained machine learning model;

determining a vegetation migration encroachment onto the pipeline right-of-way by application of the clipped images to the trained machine learning model;

generating an image for each portion the right-of-way overlayed with (a) one or more probability indicators that indicate potential vegetation encroachment based on the vegetation migration encroachment determined by the trained machine learning model and (b) one or more features of the corresponding portion of the pipeline right-of-way; and in response to a determination that the vegetation migration encroachment exceeds a threshold, generating an indication of vegetation migration encroachment.

2. The method of claim 1, wherein application of the clipped images to the trained machine learning model provides the indication of vegetation migration encroachment via images with overlayed pre-defined classifications.

3. The method of claim 2, wherein the overlayed pre-defined classification comprises one or more of the pipeline right-of-way, one or more types of vegetation, or other objects.

4. The method of claim 1, wherein the area of interest for the images comprises one or more areas based on one or more of (a) geographic location or (b) a risk associated with the one or more sections of the pipeline right-of-way.

5. The method of claim 1, wherein training the trained machine learning model comprises:

collecting historical images of the one or more sections of the pipeline right-of-way, classifying vegetation and portions of the pipeline right-of-way in the historical images to generate a classified set of historical images, training a machine learning model with a first subset of the classified set of historical images to generate the trained machine learning model, and testing the trained machine learning model with a second subset of the classified set of historical images.

6. The method of claim 5, wherein testing the trained machine learning model produces a model accuracy value, and the method further comprising, in response to the model accuracy value being less than a selected threshold:

collecting additional images, and re-training the trained machine learning model with the additional images.

7. The method of claim 6, further comprising:

in response to reception of a marked up vegetation migration encroachment or a validated vegetation migration encroachment, refining the trained machine learning model with one or more of the marked up vegetation migration encroachment or the validated vegetation migration encroachment.

8. The method of claim 6, wherein the additional images include marked up images indicating a type of vegetation encroachment, and wherein the type of vegetation encroachment includes one or more of (a) vegetation growing on a surface of the pipeline right-of-way of a selected height or (b) canopy overgrowth along the pipeline right-of-way.

9. The method of claim 1, wherein application of the clipped images to the trained machine learning model produces one or more of: (a) a location and size of vegetation encroachment, (b) spatial data of the pipeline right-of-way, (c) a three dimensional image including polygons indicating vegetation migration encroachment, (d) a two dimensional image including indicators for the vegetation encroachment, or (e) coordinates of vegetation encroachment.

10. The method of claim 1, wherein the indication of vegetation migration encroachment includes an alert, wherein the alert includes a remedial or corrective action, and wherein the remedial or corrective action comprises one or more of (a) cutting branches or trees, (b) mowing a portion of the pipeline right-of-way, or (c) removing other objects blocking the pipeline right-of-way.

11. The method of claim 1, wherein the pipeline right-of-way buffer comprises a range of about 20 feet to about 50 feet from a center of the pipeline right-of-way.

12. The method of claim 1, wherein a controller stores the trained machine learning model, wherein the trained machine learning model utilizes a semantic segmentation algorithm, and wherein the trained machine learning model (a) determines, via the semantic segmentation algorithm, a category of each pixel in each of the clipped images and (b) determines the vegetation migration encroachment based on the category of each pixel in each of the clipped images.

13. A method to determine vegetation migration encroachment along a right-of-way associated with an underground feature, the method comprising:

capturing images of one or more sections of the right-of-way that corresponds to the underground feature at a selected time period;

pre-processing the images so as to define pre-processed images;

determining vegetation migration encroachment onto the right-of-way that corresponds to the underground feature by application of the pre-processed images to a trained machine learning model; and in response to a determination that the vegetation migration encroachment exceeds a threshold, generating, by the trained machine learning model, a prediction of when a remedial action addressing the vegetation migration encroachment must be taken; and generating, by the trained machine learning model, an image of the right-of-way with one or more indicators that indicate potential vegetation migration encroachment overlayed on the image of the right-of-way, and when the remedial action addressing the vegetation migration encroachment must be performed.

14. The method of claim 13, wherein pre-processing the images comprises:

georeferencing the images to correlate the images with a surface of a geographical location of the right-of-way, determining an area of interest for the images, clipping the area of interest for the images to define clipped images, and tiling clipped images to a preselected size so as to define the pre-processed images based on one or more selected sizes utilized by a trained machine learning model.

15. The method of claim 14, wherein determination of the area of interest is based on one or more of the geographical location of the right-of-way or a previously known areas of interest.

16. The method of claim 14, wherein the clipping of the area of interest for the images is based on a right-of-way buffer.

17. The method of claim 16, wherein the right-of-way buffer comprises a range of about 20 to about 50 feet from a center of the right-of-way.

18. The method of claim 13, wherein the underground feature comprises one of utility lines, sewage lines or tanks, septic lines or tanks, or tunnels.

19. The method of claim 13, wherein the underground feature comprises pipeline, and wherein the pipeline transports hydrocarbons.

20. A system for managing and determining vegetation encroachment along an underground pipeline right-of-way, the system comprising:

an image capture circuitry configured to:

receive images of one or more sections of the underground pipeline right-of-way; and a vegetation encroachment modeling circuitry configured to:

pre-process the images based on one or more of (a) a geographic location for each of the images, (b) known areas of interest, or an underground pipeline right-of-way buffer, apply pre-processed images to a trained machine learning model, generate, by the trained machine learning model, a prediction for each location represented in the images when each location will experience vegetation encroachment and when an inspection should be performed based on the pre-processed images, determine an output image for each location represented in the images including indicators to indicate predicted vegetation encroachment and the underground pipeline right-of-way.

21. The system of claim 20, wherein the images are captured and received during a selected time period based on one or more of a location or known inspection interval of one or more sections of the underground pipeline right-of-way.

22. The system of claim 21, wherein the vegetation encroachment modeling circuitry further is configured to:

based on the output image for each of the one or more sections of the underground pipeline right-of-way, determine a new selected time period for each corresponding one or more sections of the underground pipeline right-of-way.

23. The system of claim 20, further comprising one or more controllers, and wherein the one or more controllers include the image capture circuitry and the vegetation encroachment modeling circuitry.

24. A computing device for determining vegetation encroachment along a pipeline right-of-way, the computing device comprising one or more processors and a non-transitory computer-readable storage medium storing software instructions that, when executed by the one or more processors:

in response to reception of images of one or more sections of the underground pipeline right-of-way from a selected time period, georeference the images to correlate the images with a surface of a geographical location of the underground pipeline right-of-way;

determine an area of interest for the images based on one or more of the geographical location of the pipeline right-of-way, previously known areas of interest, or corresponding selected inspection times;

clip the area of interest from the images to define clipped images based on an underground pipeline right-of-way buffer, wherein a clipped image does not include a portion of the image that includes one or more of an area that is not near the right-of-way or an area of the right-of-way that could not be affected by vegetation encroachment;

tile clipped images to a preselected size to define a plurality of tiled clipped images based on selected sizes utilized by a trained machine learning model;

determine vegetation migration encroachment onto the pipeline right-of-way by application of the clipped images to the trained machine learning model;

generate, by the trained machine learning model, a prediction for the pipeline right-of-way of when the pipeline right-of-way will experience vegetation encroachment and when an inspection should be performed based on the clipped images; and generate an image for the underground pipeline right-of-way overlayed with the prediction.

25. The computing device of claim 24, wherein the images are high-resolution aerial images captured by a high-resolution camera on an unmanned aerial vehicle.

26. The computing device of claim 25, wherein the georeferenced images are accurate within about 95% of actual landscape of the underground pipeline right-of-way, based on known landmarks and the high-resolution image camera positioned on the unmanned aerial vehicle.

27. The computing device of claim 24, wherein the indication of vegetation migration encroachment includes images of the pipeline right-of-way overlayed with highlighted areas to indicate the vegetation migration encroachment.

28. The computing device of claim 24, further comprising software instructions, when executed by the one or more processors, to, in response to generation of the indication of vegetation migration encroachment:

determine a level of the vegetation migration encroachment, and if the level of the vegetation migration encroachment exceeds a threshold, generate an alert.

29. The system of claim 20, wherein the vegetation encroachment modeling circuitry controls one or more vehicles or components associated with one or more of the underground pipeline right-of-way or the underground pipeline, and wherein the vegetation encroachment modeling circuitry is further configured to one of perform or initiate the remedial action via the one or more vehicles or components.

30. The computing device of claim 24, further comprising:

generating, by the trained machine learning model, a prediction of when remedial action should be taken; and overlaying the image for the underground pipeline right-of-way with the prediction of when remedial action should be taken.

* * * * *